US012684670B2

(12) United States Patent
Alexander et al.

(10) Patent No.: US 12,684,670 B2
(45) **Date of Patent: *Jul. 14, 2026**

(54) RESETTABLE LIGHTING SYSTEM AND METHOD

(71) Applicant: Feit Electric Company, Inc., Pico Rivera, CA (US)

(72) Inventors: Marc Alexander, San Francisco, CA (US); Philip Anthony Bosua, Selby (AU)

(73) Assignee: Feit Electric Company, Inc.

( * ) Notice: Subject to any disclaimer, the term of this patent is extended or adjusted under 35 U.S.C. 154(b) by 221 days.

This patent is subject to a terminal disclaimer.

(21) Appl. No.: 18/635,449

(22) Filed: Apr. 15, 2024

(65) Prior Publication Data

US 2024/0260161 A1 Aug. 1, 2024

Related U.S. Application Data

(60) Continuation of application No. 18/182,867, filed on Mar. 13, 2023, now Pat. No. 11,985,749, which is a
(Continued)

(51) Int. Cl.
*H05B 45/60* (2022.01)
*H05B 45/30* (2020.01)
*H05B 47/195* (2020.01)

(52) U.S. Cl.
CPC ............ *H05B 45/60* (2020.01); *H05B 45/30* (2020.01); *H05B 47/195* (2020.01)

(58) Field of Classification Search
CPC ....... H05B 45/30; H05B 45/60; H05B 47/195
See application file for complete search history.

(56) References Cited

U.S. PATENT DOCUMENTS 433,167 A 7/1890 Glover
463,584 A 11/1891 Scholfield
(Continued)

FOREIGN PATENT DOCUMENTS

CN 2558026 Y 6/2003
CN 101309237 A 11/2008
(Continued)

OTHER PUBLICATIONS

A New Kind of Clean, Vyv Antimicrobial Light works around the clock to create cleaner environments in the places we live, work, and play, viv, https://vyv.tech, downloaded Sep. 24, 2020.
(Continued)

*Primary Examiner* — Daniel D Chang
(74) *Attorney, Agent, or Firm* — Alston & Bird LLP

(57) ABSTRACT

A lighting system, including: light emitting elements; a reset switch operable in a first and second state; non-volatile reset memory configured to record the state of the reset switch when power is provided to the system; a wireless communication system; non-volatile communication memory configured to store default settings and configuration settings; a control system operable, in response to initial power provision to the control system, between: a configured mode when an instantaneous reset switch state matches the recorded state, the configured mode including: connecting the wireless communication system to a remote device based on the configuration settings, receiving instructions from the remote device, and controlling light emitting element operation based on the instructions; and a reset mode when the instantaneous reset switch state differs from the recorded state, the reset mode including: erasing the configuration settings from the communication memory and operating the system based on the default settings.

17 Claims, 8 Drawing Sheets

Related U.S. Application Data continuation of application No. 16/991,309, filed on Aug. 12, 2020, now Pat. No. 11,632,846, which is a continuation of application No. 16/750,417, filed on Jan. 23, 2020, now Pat. No. 10,779,385, which is a division of application No. 16/290,361, filed on Mar. 1, 2019, now Pat. No. 10,588,206, which is a continuation of application No. 16/106,899, filed on Aug. 21, 2018, now abandoned, which is a continuation of application No. 15/884,213, filed on Jan. 30, 2018, now Pat. No. 10,085,331, which is a continuation of application No. 14/933,878, filed on Nov. 5, 2015, now Pat. No. 9,936,566, which is a continuation of application No. 14/542,312, filed on Nov. 14, 2014, now Pat. No. 9,210,779.

(60) Provisional application No. 61/904,101, filed on Nov. 14, 2013.

(56) References Cited

U.S. PATENT DOCUMENTS 590,523 A 9/1897 Heath
600,368 A 3/1898 Jones et al.
601,278 A 3/1898 Pusey
605,786 A 6/1898 Herreshoff
616,120 A 12/1898 Leaycraft
623,774 A 4/1899 Fenton
646,809 A 4/1900 Dickman
688,395 A 12/1901 Davis et al.
4,942,386 A 7/1990 Willis
5,420,607 A 5/1995 Miller et al.
5,506,946 A 4/1996 Bar et al.
5,710,545 A 1/1998 Dunn
5,769,527 A 6/1998 Taylor et al.
5,790,114 A 8/1998 Geaghan et al.
5,841,428 A 11/1998 Jaeger et al.
5,914,669 A 6/1999 Wicks et al.
6,003,206 A 12/1999 Hall et al.
6,121,976 A 9/2000 Lu
6,329,990 B1 12/2001 Silverbrook et al.
6,337,629 B1 1/2002 Bader
6,624,368 B2 9/2003 Sato et al.
6,694,125 B2 2/2004 White et al.
6,726,112 B1 4/2004 Ho
6,737,801 B2 5/2004 Ragle
6,759,966 B1 7/2004 Weng
6,949,885 B2 9/2005 Hamamoto et al.
7,103,460 B1 9/2006 Breed
7,205,495 B2 4/2007 Mazur
7,221,271 B2 5/2007 Reime
7,339,128 B2 3/2008 Yen
7,418,392 B1 8/2008 Mozer et al.
7,446,671 B2 11/2008 Giannopoulos et al.
7,474,632 B2 1/2009 Ban
7,502,033 B1 3/2009 Axelrod
7,573,208 B2 8/2009 Newman, Jr.
7,597,455 B2 10/2009 Smith et al.
7,598,885 B2 10/2009 Kwon et al.
7,667,163 B2 2/2010 Ashworth et al.
7,852,322 B2 12/2010 Park
7,859,398 B2 12/2010 Davidson et al.
7,884,556 B2 2/2011 Gandhi
7,952,322 B2 5/2011 Partovi et al.
7,980,726 B2 7/2011 Joosen et al.
8,013,545 B2 9/2011 Jonsson
8,024,517 B2 9/2011 Lafrese et al.
8,033,686 B2 10/2011 Recker et al.
8,035,320 B2 10/2011 Sibert
8,100,552 B2 1/2012 Spero
8,115,369 B2 2/2012 Kang et al.
8,160,514 B2 4/2012 Aparin et al.
8,195,313 B1 6/2012 Fadell et al.
8,207,821 B2 6/2012 Roberge et al.
8,253,344 B2 8/2012 Guest et al.
8,282,250 B1 10/2012 Dassanayake et al.
8,294,379 B2 10/2012 Liu et al.
8,299,719 B1 10/2012 Moshirnoroozi
8,314,566 B2 11/2012 Steele et al.
8,334,777 B2 12/2012 Wilson et al.
8,373,360 B2 2/2013 Leung et al.
8,390,201 B2 3/2013 Yasuda et al.
8,390,207 B2 3/2013 Dowling et al.
8,398,264 B2 3/2013 Anderson et al.
8,433,530 B2 4/2013 Shimada et al.
8,446,288 B2 5/2013 Mizushima et al.
8,491,159 B2 7/2013 Recker et al.
8,523,410 B2 9/2013 Hashimoto et al.
8,562,158 B2 10/2013 Chien
8,569,968 B2 10/2013 Hsiao et al.
8,581,512 B2 11/2013 Hamamoto et al.
8,593,073 B2 11/2013 Aldrich et al.
8,641,241 B2 2/2014 Farmer
8,669,716 B2 3/2014 Recker et al.
8,723,434 B2 5/2014 Watson et al.
8,723,794 B2 5/2014 Corson et al.
8,742,594 B2 6/2014 Daubenspeck et al.
8,742,694 B2 6/2014 Bora et al.
8,743,023 B2 6/2014 Maxik et al.
8,743,923 B2 6/2014 Geske et al.
8,755,561 B2 6/2014 Vlutters et al.
8,760,370 B2 6/2014 Maxik et al.
8,760,514 B2 6/2014 Chien
8,764,251 B2 7/2014 Lien
8,770,771 B2 7/2014 Preta et al.
8,788,966 B2 7/2014 Josephson et al.
8,812,827 B2 8/2014 Malasani
8,820,984 B2 9/2014 Gillio
8,829,799 B2 9/2014 Recker et al.
8,834,009 B2 9/2014 Chien
8,854,443 B2 10/2014 Kryger et al.
8,858,029 B2 10/2014 Brandes et al.
8,888,306 B2 11/2014 Thomas et al.
8,890,435 B2 11/2014 Bora et al.
8,902,049 B2 12/2014 Fushimi et al.
8,928,232 B2 1/2015 Aggarwal et al.
8,941,013 B2 1/2015 Arnold
8,947,013 B2 2/2015 Sutardja et al.
8,960,940 B2 2/2015 Hellkamp
8,981,913 B2 3/2015 Henig et al.
8,994,276 B2 3/2015 Recker et al.
9,024,517 B2 5/2015 Yuan et al.
9,030,120 B2 5/2015 Pickard et al.
9,039,233 B2 5/2015 Fournier et al.
9,049,756 B2 6/2015 Klusmann et al.
9,055,055 B1 6/2015 Strand et al.
9,074,736 B2 7/2015 Recker et al.
9,080,758 B2 7/2015 Igaki et al.
9,113,528 B2 8/2015 Bora et al.
9,172,917 B1 10/2015 Fu et al.
9,192,032 B2 11/2015 Kwag et al.
9,198,262 B1 11/2015 Bosua et al.
9,210,779 B2 12/2015 Bosua et al.
9,247,625 B2 1/2016 Recker et al.
9,253,859 B2 2/2016 Chung
9,326,359 B2 4/2016 Bosua
9,338,864 B2 5/2016 Bosua et al.
9,345,098 B2 5/2016 Joseph et al.
9,351,378 B2 5/2016 Aggarwal et al.
9,368,695 B2 6/2016 David et al.
9,404,624 B2 8/2016 Chung
9,408,282 B1 8/2016 Springer
9,410,664 B2 8/2016 Krames et al.
9,497,819 B2 11/2016 Van et al.
9,510,426 B2 11/2016 Chemel et al.
9,526,151 B2 12/2016 Kreiner et al.
9,534,773 B1 1/2017 Turudic
9,538,619 B2 1/2017 Swatsky et al.
9,578,722 B2 2/2017 Feng et al.
9,635,737 B2 4/2017 Bosua et al.
9,644,799 B2 5/2017 Crayford et al.
9,651,243 B1 5/2017 Springer
9,677,755 B1 6/2017 Linnell et al.

(56) References Cited

U.S. PATENT DOCUMENTS

| | | | |
|---|---|---|---|
| 9,696,200 | B2 | 7/2017 | Ramer et al. |
| 9,699,871 | B2 | 7/2017 | Karc et al. |
| 9,801,260 | B2 | 10/2017 | Anthony et al. |
| 9,883,563 | B2 | 1/2018 | Bosua et al. |
| 9,936,566 | B2 | 4/2018 | Alexander et al. |
| 10,047,912 | B2 | 8/2018 | Bosua et al. |
| 10,085,331 | B2 | 9/2018 | Alexander et al. |
| 10,129,937 | B1 | 11/2018 | Lin et al. |
| 10,129,955 | B2 | 11/2018 | Rogers et al. |
| 10,129,965 | B2 | 11/2018 | Bosua et al. |
| 10,136,292 | B2 | 11/2018 | Bosua et al. |
| 10,274,160 | B2 | 4/2019 | Parker et al. |
| 10,304,901 | B1 | 5/2019 | Xu et al. |
| 10,375,789 | B2 | 8/2019 | Bosua et al. |
| 10,440,794 | B2 | 10/2019 | Alexander et al. |
| 10,588,206 | B2 | 3/2020 | Alexander et al. |
| 10,772,171 | B2 | 9/2020 | Bosua et al. |
| 10,779,385 | B2 | 9/2020 | Alexander et al. |
| 11,455,884 | B2 | 9/2022 | Bosua et al. |
| 11,632,846 | B2 | 4/2023 | Alexander et al. |
| 2002/0047628 | A1 | 4/2002 | Morgan et al. |
| 2002/0111135 | A1 | 8/2002 | White et al. |
| 2002/0145394 | A1 | 10/2002 | Morgan et al. |
| 2003/0019734 | A1 | 1/2003 | Sato et al. |
| 2003/0117408 | A1 | 6/2003 | Forsline et al. |
| 2004/0105264 | A1 | 6/2004 | Spero |
| 2004/0129946 | A1 | 7/2004 | Nagai et al. |
| 2004/0160198 | A1 | 8/2004 | Hewlett et al. |
| 2004/0212318 | A1 | 10/2004 | Hamamoto et al. |
| 2005/0116667 | A1 | 6/2005 | Mueller et al. |
| 2005/0128751 | A1 | 6/2005 | Roberge et al. |
| 2005/0236263 | A1 | 10/2005 | Mazur |
| 2005/0237341 | A1 | 10/2005 | Gangnet et al. |
| 2005/0278778 | A1 | 12/2005 | D'Agostino et al. |
| 2006/0002309 | A1 | 1/2006 | Ban |
| 2006/0044800 | A1 | 3/2006 | Reime |
| 2006/0047132 | A1 | 3/2006 | Shenai-Khatkhate et al. |
| 2006/0049935 | A1 | 3/2006 | Giannopoulos et al. |
| 2006/0139907 | A1 | 6/2006 | Yen |
| 2006/0198157 | A1 | 9/2006 | Ruan |
| 2006/0280660 | A1 | 12/2006 | Weiss |
| 2007/0085863 | A1 | 4/2007 | Moriya et al. |
| 2007/0119484 | A1 | 5/2007 | Kwon et al. |
| 2007/0145915 | A1 | 6/2007 | Roberge et al. |
| 2007/0182367 | A1 | 8/2007 | Partovi |
| 2007/0223219 | A1 | 9/2007 | Medenporp et al. |
| 2008/0006709 | A1 | 1/2008 | Ashworth et al. |
| 2008/0049043 | A1 | 2/2008 | Titmuss et al. |
| 2008/0062192 | A1 | 3/2008 | Voliter et al. |
| 2008/0092800 | A1 | 4/2008 | Smith et al. |
| 2008/0106887 | A1 | 5/2008 | Salsbury et al. |
| 2008/0143273 | A1 | 6/2008 | Davidson et al. |
| 2008/0198175 | A1 | 8/2008 | Sun et al. |
| 2008/0218099 | A1 | 9/2008 | Newman |
| 2008/0265799 | A1 | 10/2008 | Sibert |
| 2009/0052182 | A1 | 2/2009 | Matsuba et al. |
| 2009/0059603 | A1 | 3/2009 | Recker et al. |
| 2009/0121651 | A1 | 5/2009 | Gandhi |
| 2009/0128059 | A1 | 5/2009 | Joosen et al. |
| 2009/0146982 | A1 | 6/2009 | Thielman et al. |
| 2009/0147508 | A1 | 6/2009 | Bertram et al. |
| 2009/0190338 | A1 | 7/2009 | Huang |
| 2009/0251127 | A1 | 10/2009 | Kim |
| 2009/0284169 | A1 | 11/2009 | Valois |
| 2009/0295310 | A1 | 12/2009 | Duerr et al. |
| 2010/0068899 | A1 | 3/2010 | Shvili |
| 2010/0070217 | A1 | 3/2010 | Shimada et al. |
| 2010/0118527 | A1 | 5/2010 | Choong |
| 2010/0127638 | A1 | 5/2010 | Lan et al. |
| 2010/0141153 | A1 | 6/2010 | Recker et al. |
| 2010/0172120 | A1 | 7/2010 | Wegh et al. |
| 2010/0194687 | A1 | 8/2010 | Corson et al. |
| 2010/0204841 | A1 | 8/2010 | Chemel et al. |
| 2010/0207534 | A1 | 8/2010 | Dowling et al. |
| 2010/0277067 | A1 | 11/2010 | Maxik et al. |
| 2010/0289664 | A1 | 11/2010 | Mizushima et al. |
| 2010/0296285 | A1 | 11/2010 | Chemel et al. |
| 2010/0301773 | A1 | 12/2010 | Chemel et al. |
| 2010/0327766 | A1 | 12/2010 | Recker et al. |
| 2011/0050120 | A1 | 3/2011 | Leung et al. |
| 2011/0074672 | A1 | 3/2011 | Diederiks et al. |
| 2011/0089838 | A1 | 4/2011 | Pickard et al. |
| 2011/0089842 | A1 | 4/2011 | Aldrich et al. |
| 2011/0095687 | A1 | 4/2011 | Jonsson |
| 2011/0109216 | A1 | 5/2011 | Kang et al. |
| 2011/0109249 | A1 | 5/2011 | Liu et al. |
| 2011/0133655 | A1 | 6/2011 | Recker et al. |
| 2011/0161865 | A1 | 6/2011 | Josephsoon et al. |
| 2011/0163683 | A1 | 7/2011 | Steele et al. |
| 2011/0199004 | A1 | 8/2011 | Henig et al. |
| 2011/0216085 | A1 | 9/2011 | Bergman et al. |
| 2011/0227469 | A1 | 9/2011 | Yuan et al. |
| 2011/0227495 | A1 | 9/2011 | Guest et al. |
| 2011/0234366 | A1 | 9/2011 | Feng et al. |
| 2011/0260648 | A1 | 10/2011 | Hamamoto et al. |
| 2011/0285515 | A1 | 11/2011 | Fushimi et al. |
| 2011/0309769 | A1 | 12/2011 | Kuroki et al. |
| 2012/0025717 | A1 | 2/2012 | Klusmann et al. |
| 2012/0026726 | A1 | 2/2012 | Recker et al. |
| 2012/0080944 | A1 | 4/2012 | Recker et al. |
| 2012/0120243 | A1 | 5/2012 | Chien |
| 2012/0126699 | A1 | 5/2012 | Zittel |
| 2012/0130547 | A1 | 5/2012 | Fadell et al. |
| 2012/0146505 | A1 | 6/2012 | Jonsson |
| 2012/0147604 | A1 | 6/2012 | Farmer |
| 2012/0153868 | A1 | 6/2012 | Gu et al. |
| 2012/0188172 | A1 | 7/2012 | Fong |
| 2012/0195053 | A1 | 8/2012 | Wu |
| 2012/0206050 | A1 | 8/2012 | Spero |
| 2012/0218407 | A1 | 8/2012 | Chien |
| 2012/0218421 | A1 | 8/2012 | Chien |
| 2012/0224381 | A1 | 9/2012 | Hashimoto et al. |
| 2012/0281879 | A1 | 11/2012 | Vlutters et al. |
| 2012/0287488 | A1 | 11/2012 | Oto |
| 2012/0287601 | A1 | 11/2012 | Pickard et al. |
| 2012/0293652 | A1 | 11/2012 | Farmer |
| 2012/0299476 | A1 | 11/2012 | Roberts et al. |
| 2012/0300441 | A1 | 11/2012 | Thomas et al. |
| 2012/0306377 | A1 | 12/2012 | Igaki et al. |
| 2013/0021795 | A1 | 1/2013 | Chien |
| 2013/0038230 | A1 | 2/2013 | Brown et al. |
| 2013/0049598 | A1 | 2/2013 | Nagashima et al. |
| 2013/0063042 | A1 | 3/2013 | Bora et al. |
| 2013/0099672 | A1 | 4/2013 | Lin et al. |
| 2013/0106283 | A1 | 5/2013 | Gillio |
| 2013/0113715 | A1 | 5/2013 | Grant et al. |
| 2013/0121569 | A1 | 5/2013 | Yadav |
| 2013/0148341 | A1 | 6/2013 | Williams |
| 2013/0154985 | A1 | 6/2013 | Miyazaki |
| 2013/0193847 | A1 | 8/2013 | Recker et al. |
| 2013/0249392 | A1 | 9/2013 | Kim |
| 2013/0249435 | A1 | 9/2013 | Hellkamp |
| 2013/0257312 | A1 | 10/2013 | Maxik et al. |
| 2013/0264943 | A1 | 10/2013 | Bora et al. |
| 2013/0278132 | A1 | 10/2013 | Yuan et al. |
| 2013/0278162 | A1 | 10/2013 | Watson et al. |
| 2013/0278172 | A1 | 10/2013 | Maxik et al. |
| 2013/0292106 | A1 | 11/2013 | Lien |
| 2013/0314680 | A1 | 11/2013 | Yamamura |
| 2013/0326381 | A1 | 12/2013 | Pereira et al. |
| 2014/0021862 | A1 | 1/2014 | Chung |
| 2014/0028199 | A1 | 1/2014 | Chemel |
| 2014/0029749 | A1 | 1/2014 | Malasani |
| 2014/0043825 | A1 | 2/2014 | Brandes et al. |
| 2014/0046152 | A1 | 2/2014 | Bechtel et al. |
| 2014/0049983 | A1 | 2/2014 | Nichol et al. |
| 2014/0084809 | A1 | 3/2014 | Catalano |
| 2014/0097071 | A1 | 4/2014 | Park et al. |
| 2014/0117859 | A1 | 5/2014 | Swatsky et al. |
| 2014/0118385 | A1 | 5/2014 | Buckley et al. |
| 2014/0152188 | A1 | 6/2014 | Bora et al. |
| 2014/0159600 | A1 | 6/2014 | Sutardja et al. |
| 2014/0184577 | A1 | 7/2014 | Kim et al. |
| 2014/0239811 | A1 | 8/2014 | Kreiner et al. |

(56) References Cited

U.S. PATENT DOCUMENTS

| | | | |
|---|---|---|---|
| 2014/0265864 | A1 | 9/2014 | Hickok et al. |
| 2014/0265881 | A1* | 9/2014 | Karc ........................ H02J 13/00 307/130 |
| 2014/0265900 | A1 | 9/2014 | Sadwick et al. |
| 2014/0273715 | A1 | 9/2014 | Moll et al. |
| 2014/0273892 | A1 | 9/2014 | Nourbakhsh |
| 2014/0285999 | A1 | 9/2014 | Luna et al. |
| 2014/0300293 | A1 | 10/2014 | Ruan et al. |
| 2014/0300294 | A1 | 10/2014 | Zampini et al. |
| 2014/0321122 | A1 | 10/2014 | Domagala et al. |
| 2014/0354150 | A1 | 12/2014 | Joseph et al. |
| 2015/0015165 | A1 | 1/2015 | Engelen et al. |
| 2015/0038246 | A1 | 2/2015 | Zeid |
| 2015/0048760 | A1 | 2/2015 | Kwag et al. |
| 2015/0062892 | A1 | 3/2015 | Krames et al. |
| 2015/0084513 | A1 | 3/2015 | Anthony et al. |
| 2015/0084515 | A1 | 3/2015 | Altamura et al. |
| 2015/0103515 | A1 | 4/2015 | Bosua et al. |
| 2015/0103520 | A1 | 4/2015 | Fournier et al. |
| 2015/0108904 | A1 | 4/2015 | Chen |
| 2015/0130359 | A1 | 5/2015 | Bosua et al. |
| 2015/0141755 | A1 | 5/2015 | Tesar |
| 2015/0189721 | A1 | 7/2015 | Karc et al. |
| 2015/0208900 | A1 | 7/2015 | Vidas et al. |
| 2015/0236225 | A1 | 8/2015 | David et al. |
| 2015/0250042 | A1 | 9/2015 | Aggarwal et al. |
| 2015/0325157 | A1 | 11/2015 | Jumblatt et al. |
| 2015/0325163 | A1 | 11/2015 | Kobayashi |
| 2015/0345764 | A1 | 12/2015 | Hussey et al. |
| 2015/0359061 | A1 | 12/2015 | Adler |
| 2015/0382463 | A1 | 12/2015 | Kim et al. |
| 2016/0007431 | A1 | 1/2016 | Bosua et al. |
| 2016/0030610 | A1 | 2/2016 | Peterson et al. |
| 2016/0061396 | A1 | 3/2016 | Bosua et al. |
| 2016/0066387 | A1 | 3/2016 | Darton et al. |
| 2016/0066393 | A1 | 3/2016 | Bosua |
| 2016/0066397 | A1 | 3/2016 | Alexander et al. |
| 2016/0073474 | A1 | 3/2016 | Van et al. |
| 2016/0073479 | A1 | 3/2016 | Erchak et al. |
| 2016/0100086 | A1 | 4/2016 | Chien |
| 2016/0264054 | A1 | 9/2016 | Uken et al. |
| 2016/0286627 | A1 | 9/2016 | Chen et al. |
| 2016/0364854 | A1 | 12/2016 | Wieser |
| 2017/0118815 | A1 | 4/2017 | Altamura et al. |
| 2017/0163439 | A1 | 6/2017 | Bosua et al. |
| 2017/0231072 | A1 | 8/2017 | Bosua et al. |
| 2017/0309215 | A1 | 10/2017 | Perdices-Gonzalez et al. |
| 2017/0310940 | A1 | 10/2017 | Perdices-Gonzalez et al. |
| 2017/0310956 | A1 | 10/2017 | Perdices-Gonzalez et al. |
| 2017/0347422 | A1 | 11/2017 | Wang et al. |
| 2018/0005590 | A1 | 1/2018 | Komanduri et al. |
| 2018/0022274 | A1 | 1/2018 | Kincade et al. |
| 2018/0177033 | A1 | 6/2018 | Alexander et al. |
| 2018/0240418 | A1 | 8/2018 | Kobayashi |
| 2019/0008025 | A1 | 1/2019 | Alexander et al. |
| 2019/0034106 | A1 | 1/2019 | Shin et al. |
| 2019/0200438 | A1 | 6/2019 | Alexander et al. |
| 2019/0254137 | A1 | 8/2019 | Sevo et al. |
| 2020/0163192 | A1 | 5/2020 | Alexander et al. |
| 2020/0375014 | A1 | 11/2020 | Alexander et al. |
| 2020/0389951 | A1 | 12/2020 | Bosua et al. |
| 2021/0192936 | A1 | 6/2021 | Bosua et al. |

FOREIGN PATENT DOCUMENTS

| | | | | |
|---|---|---|---|---|
| CN | 101897236 | A | 11/2010 | |
| CN | 201662712 | U | 12/2010 | |
| CN | 201758454 | U | 3/2011 | |
| CN | 201986217 | U | 9/2011 | |
| CN | 102573220 | A | 7/2012 | |
| CN | 103067492 | A | 4/2013 | |
| CN | 203099410 | U | 7/2013 | |
| WO | WO-2007095740 | A1 * | 8/2007 | ........... H05B 47/196 |
| WO | 2014/040118 | A1 | 3/2014 | |
| WO | 2014/101321 | A1 | 7/2014 | |

OTHER PUBLICATIONS

Advisory Action for U.S. Appl. No. 17/191,539, dated Jan. 12, 2023, (7 pages), United States Patent and Trademark Office, US.

Boost Your Sales Immediately, Add An LED Display From Cirrus, Cirrus LED, (Year: 2016), (9 pages), [Retrieved from the Internet Jan. 26, 2018] <URL: https://cirrusled.com!>.

Clover, Juli. "Review: Nanoleaf's 'Aurora Smarter Kit' Offers Awesome HomeKit-Enabled Mood Lighting For $200," Nanoleaf Aurora Light Panels Review—MacRumors, Nov. 16, 2018, (17 pages), [Retrieved from the Internet Jan. 26, 2018] <URL: https://www.macrumors.com/review/nanoleaf-aurora-smarter-kit/>.

Communication about intention to grant a European patent Mailed on Jan. 10, 2020 for EP Application No. 15795745, 6 page(s).

Decision to grant a European patent Mailed on Mar. 26, 2020 for EP Application No. 15795745, 2 page(s).

EP Office Action Mailed on Jul. 31, 2018 for EP Application No. 15795745, 5 page(s).

European search report Mailed on Nov. 21, 2017 for EP Application No. 15795745, 7 page(s).

International Preliminary Report on Patentability for International Application No. PCT/US2014/065799, dated May 26, 2016, (9 pages), The International Bureau of WIPO, Geneva, Switzerland.

International Search Report and Written Opinion for International Application No. PCT/US2014/065799, dated Feb. 20, 2015, (11 pages), United States Patent and Trademark Office, US.

Non-Final Rejection Mailed on Oct. 13, 2023 for U.S. Appl. No. 17/191,539, 17 page(s).

Reyes Kimberly, User Story: Grain Lighting, Oct. 21, 2013, https://www.typeamachines.com/additive-manufacturing/user-story-grain-lighting.

The Light with the Power to Boost your Defense Against Bacteria, Ellumi Lighting, LED Genrn Killing Disinfection ighting, https://www.ellumilighting.com, downloaded Sep. 25, 2020.

United States Patent and Trademark Office, Non-Final Office Action received for U.S. Appl. No. 17/191,539, dated Feb. 8, 2023, 17 pages, US.

U.S. Appl. No. 18/182,867, filed Mar. 13, 2023, U.S. Pat. No. 11,985,749, Issued.

U.S. Appl. No. 16/991,309, filed Aug. 12, 2020, U.S. Pat. No. 11,632,846, Issued.

U.S. Appl. No. 16/750,417, filed Jan. 23, 2020, U.S. Pat. No. 10,779,385, Issued.

U.S. Appl. No. 16/290,361, filed Mar. 1, 2019, U.S. Appl. No. 10/588,206, Issued.

U.S. Appl. No. 16/106,899, filed Aug. 21, 2018, Abandoned.

U.S. Appl. No. 15/884,213, filed Jan. 30, 2018, U.S. Pat. No. 10,085,331, Issued.

U.S. Appl. No. 14/933,878, filed Nov. 5, 2015, U.S. Pat. No. 9,936,566, Issued.

U.S. Appl. No. 14/542,312, filed Nov. 14, 2014, U.S. Pat. No. 9,210,779, Issued.

* cited by examiner

RESETTABLE LIGHTING SYSTEM AND METHOD

CROSS-REFERENCE TO RELATED APPLICATIONS

This application is a continuation of U.S. patent application Ser. No. 18/182,867, filed Mar. 13, 2023, which is a continuation of U.S. patent application Ser. No. 16/991,309, filed Aug. 12, 2020, which is a continuation of U.S. patent application Ser. No. 16/750,417, filed 23 Jan. 2020, which is a divisional of U.S. application Ser. No. 16/290,361, filed 1 Mar. 2019, which is a continuation of U.S. patent application Ser. No. 16/106,899, filed 21 Aug. 2018, which is a continuation of U.S. patent application Ser. No. 15/884,213, filed 30 Jan. 2018, which is a continuation of U.S. patent application Ser. No. 14/933,878, filed 5 Nov. 2015, which is a continuation of US patent application Ser. No. 14/542,312, filed 14 Nov. 2014, which claims the benefit of U.S. Provisional Application No. 61/904,101 filed 14 Nov. 2013, which is incorporated in its entirety by this reference.

TECHNICAL FIELD

This invention relates generally to the lighting systems field, and more specifically to a new and useful resettable lighting system in the lighting systems field.

BRIEF DESCRIPTION OF TIE FIGURES

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System.

Figure 4:
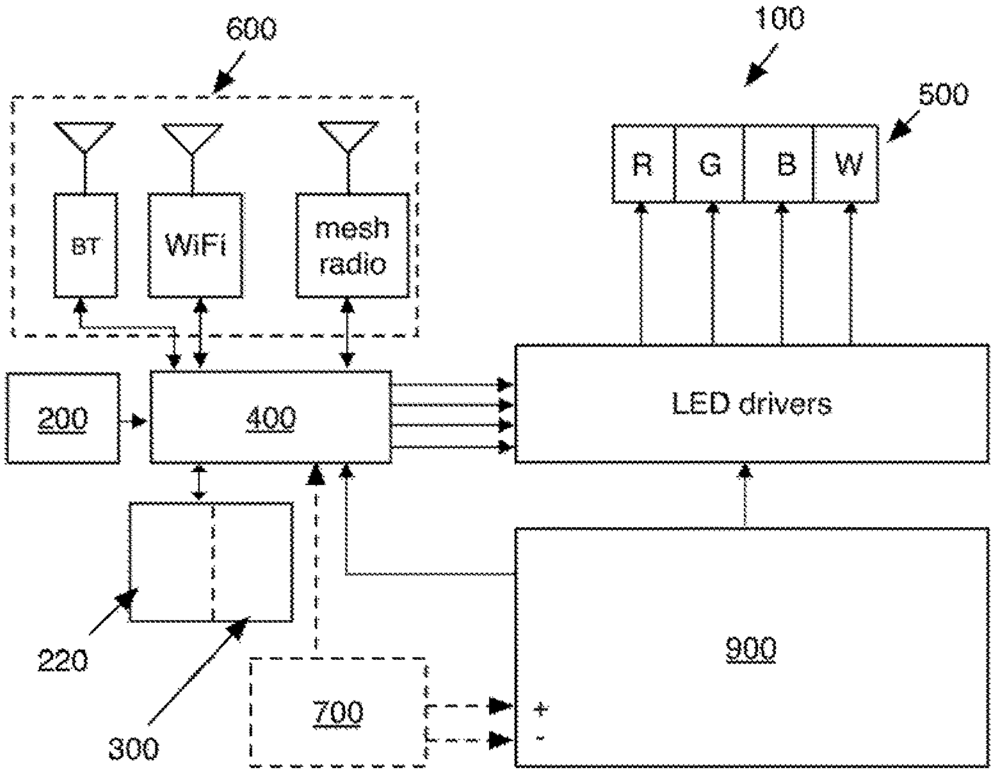
FIG. 4 is a schematic representation of a first variation of the connected system.

As shown in FIG. 4, a connected system 100 capable of being reset without continuous power supply includes a reset switch 200, reset memory 220 connected to the reset switch 200, configuration memory 300, and a control system 400. The connected system 100 can be a lighting system that additionally includes light emitting elements 500, but can alternatively be any other suitable connected device (e.g., appliance). In one variation, the lighting system is substantially similar to the lighting system disclosed in U.S. application Ser. No. 14/512,669, filed 13 Oct. 2014, incorporated herein in its entirety by this reference. However, the lighting system can be any other suitable lighting system. The lighting system functions to provide light based on a set of operating instructions received from a remote device, wherein the lighting system can connect to the remote device using a set of configuration settings stored by the lighting system. The connected system 100 can additionally function as a communication transceiver (e.g., a WiFi repeater), a notification system (e.g., during emergencies), an immersive system (e.g., be responsive to an audio/video system), or perform any other suitable functionality.

The inventors have discovered that connected devices, particularly connected appliances, require mechanisms to reboot (e.g., hard or soft reboot) and/or entirely reconfigure (e.g., factory reset or master reset) the device. Rebooting mechanisms can be required or desirable to troubleshoot the connected device, switch operating systems used by the connected device, clear corrupted or inadequately allocated memory, or for any other suitable purpose. Rebooting the connected system 100 can include closing all pending programs and finalizes the input and output operations, or otherwise rebooting the system. Performing a master reset on the connected system 100 can function to clear the configuration settings of the device to the default settings (e.g., such that the user can regain access to the connected device), remove a file or virus, clear memory space on the device, remove personal information from the device (e.g., prior to secondary sale or resale), remove data, settings, and/or applications on the device, or otherwise erase all or most of the customized information stored on the device. Resetting the connected system 100 can include erasing all information aside from the default settings from the connected system 100, or otherwise resetting the connected system 100.

A persistent reset mechanism (e.g., a reset mechanism that does not need to be powered during the reset trigger event) can be desirable in connected devices that are configured to be located in difficult-to-reach places (e.g., connected to difficult-to-reach power fixtures 4 *o*). This is due to the requirement that such connected appliances typically need to be removed from the power fixture 40 to access a reset switch 200 arranged along the device body. This problem can be particularly relevant to connected lighting systems (e.g., light bulbs), even more relevant to lighting systems that are independently operable (e.g., do not rely on a common hub), because lighting systems are not only difficult to reach when installed in ceiling fixtures, but must also be removed from the lighting fixture (e.g., particularly recessed lighting fixtures) to expose the reset mechanism for use. Some conventional reset mechanisms can be inadequate for such purposes, because they require the reset system to be powered to detect the reset trigger event (e.g., depression of a reset switch 200). Removal of the lighting system from the lighting fixture effectively disconnects the lighting system from power, which prevents such conventional reset mechanisms from detecting the trigger event and resetting the device. Thus, there is a need in the connected lighting systems field to create a new and useful powerless resettable lighting system. This invention provides such new and useful powerless resettable lighting system.

In a first variation of the connected system 100, as shown in FIG. 4, the connected system 100 includes a physical reset switch 200, operable between a first and a second state, and non-volatile reset memory 220 configured to record the reset switch 200 state prior to system powering off (e.g., prior to power termination), and remember the reset switch 200 state while the system is unpowered. When a master reset is desired, the user can switch the reset switch 200 state to the opposing state. Upon the system powering on (e.g., upon power receipt), the connected system 100 can compare the instantaneous reset switch 200 state with the prior state stored by the reset memory 220. The system can initiate a master reset in response to the instantaneous reset switch 200 state differing from the stored switch state. The system can operate the system based on the stored configuration settings (e.g., operate in a normal operation state) in response to the instantaneous reset switch 200 state matching the stored switch state.

In a second variation of the connected system 100, the connected system 100 operates in substantially the same manner as the first variation, and can additionally include rebooting the system in response to determination that the reset switch 200 state has been toggled (e.g., changed) while the connected system 100 is powered (e.g., while power is being supplied to the connected system 100).

Figure 5:
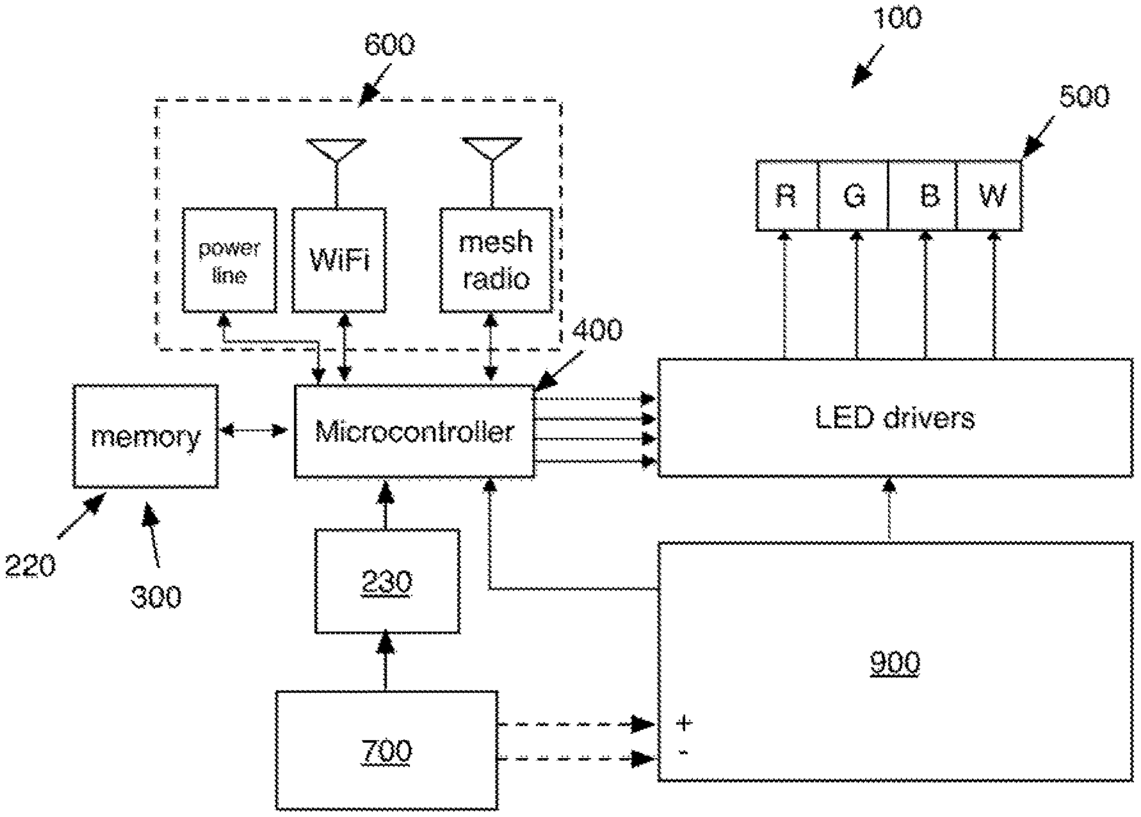
FIG. 5 is a schematic representation of a second variation of the connected system.

In a third variation of the connected system 100, as shown in FIG. 5, the connected system 100 includes a toggle detector 230 configured to monitor patterns of power supplied to the connected system 100 (e.g., power cycling pattern). This variation can be particularly relevant to connected systems 100 coupled to power fixtures 4 *o*, wherein the power fixtures 40 are intermittently connected to a power grid based on the position of a power switch 50 (e.g., wall switch). The power supply patterns detected by the connected system 100 can be established by a user toggling the power switch 50 or generated in any other suitable manner. The connected system 100 can automatically initiate a master reset in response to detection of a first power supply pattern. The connected system 100 can additionally or alternatively automatically initiate a reboot in response to detection of a second power supply pattern, different from the first power supply pattern. The connected system 100 can additionally or alternatively operate in a different operation mode (e.g., control the light emitting elements 500 to emit light having a different set of light parameters) in response to detection of a third power supply pattern, different from the first and/or second power supply patterns. This variation can function to simultaneously reset a plurality of connected systems 100 (e.g., all connected systems 100 whose power supply is controlled by the same power switch 50). However, the connected system 100 can include any other suitable reset mechanism and be reset, rebooted, or otherwise configured in any other suitable manner.

Figure 6:
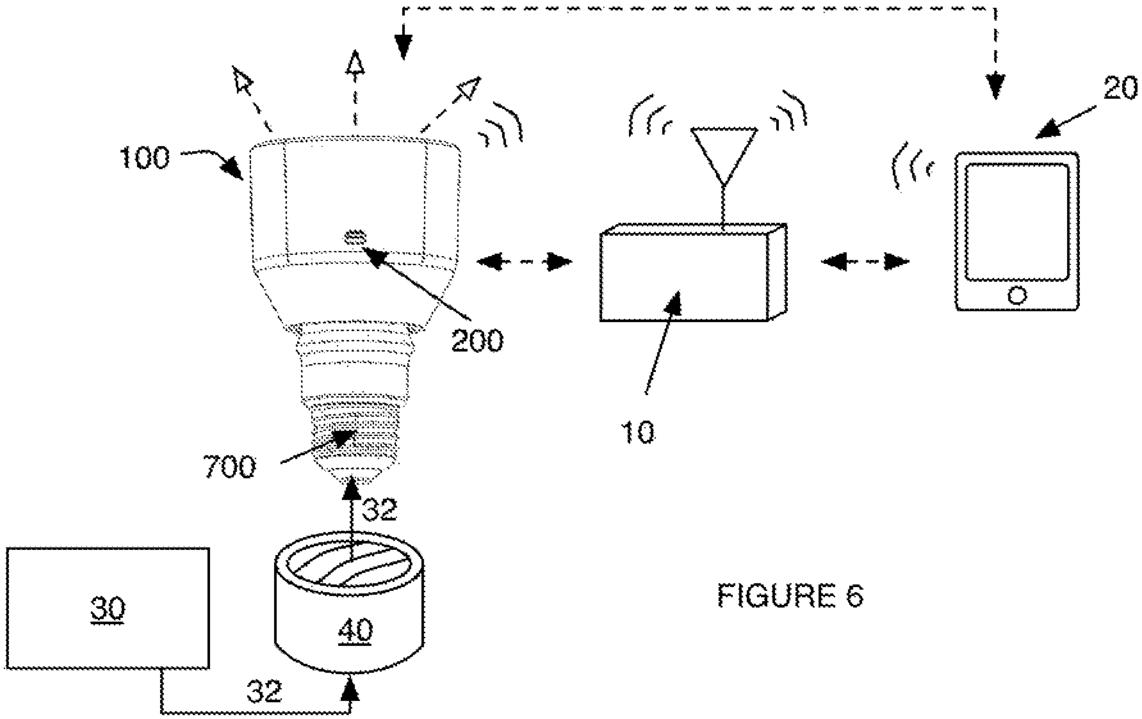
FIG. 6 is a schematic representation of a lighting system interaction with an external power source, a primary remote device, and a secondary remote device.
Figure 7:
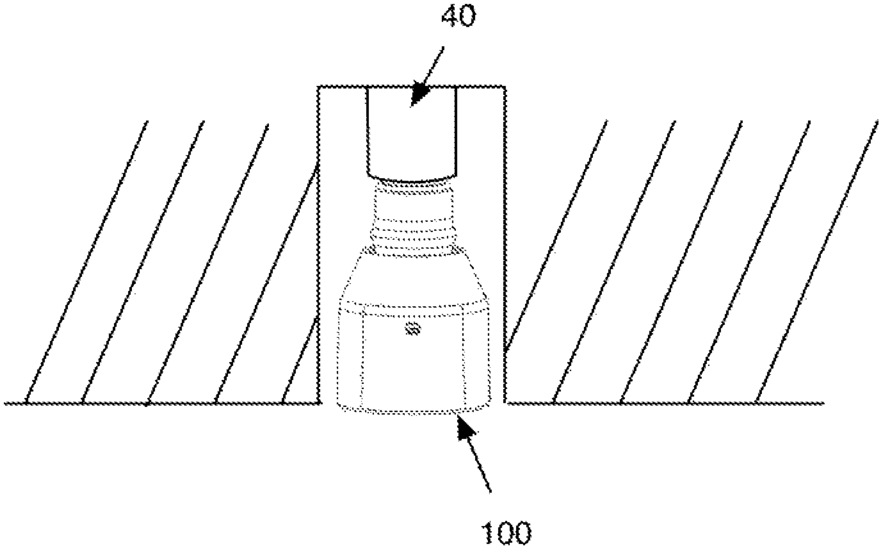
FIG. 7 is a schematic representation of a variation of the connected system installed in a recessed lighting fixture.

The connected system 100 can be used with a power fixture, which functions to provide external power 32 to the connected system 100, an example of which is shown in FIG. 6. The power fixture 40 can be a light fixture, such as a recessed light fixture (e.g., as shown in FIG. 7), surface-mounted light fixture, or any other suitable light fixture. More preferably, the power fixture 40 is a lightbulb socket (e.g., a conventional lightbulb socket), such as an Edison screw socket, bayonet socket bi-post socket, or any other suitable socket. However, the power fixture 4 *o* can be a power outlet, such as a USB port or a socket (e.g., a NEMA connector socket), or be any other suitable power supply mechanism connectable to an external power source 30, such as a power grid or power system (e.g., generator system, solar powered system, etc.). The power fixture 40 can supply power to the connected system 100 when power is supplied to the power fixture 40, and does not supply power to the connected system 100 when the power fixture 40 is unpowered or disconnected from the external power source 30. However, the power fixture 40 can selectively control power provision to the connected system 100, or operate in any other suitable manner.

The power fixture 40 can be electrically connected to a power switch 50 that functions to control power supply from the external power source 30 to the power fixture 40. The power switch 50 can be operable between a closed position, wherein power is supplied to the power fixture 40, and an open position, wherein power supply to the power fixture 40 is terminated. The power fixture 40 can be electrically connected to the external power source 30 when the power switch 50 is in the closed position, and can be electrically disconnected from the external power source 30 when the power switch 50 is in the open position. However, the power fixture 40 can be otherwise selectively powered, unpowered, connected, or disconnected from the external power source 30.

The connected system 100 can be used with a primary remote device 10 that functions to communicate information to and/or from the connected system 100. The primary remote device 10 can be associated with one or more identifiers. The identifiers can be unique identifiers (e.g., IP addresses), non-unique identifiers (e.g., user-set names), or be any other suitable identifier. The primary remote device 10 can be associated with one or more credentials, wherein the credentials can be associated with one or more identifiers associated with the primary remote device 10. The credentials can include a password, encryption key (e.g., public and/or private), or any other suitable set of credentials. The primary remote device 10 can be simultaneously connected to one or more connected systems 100, wherein each connected system 100 can store an identifier and/or set of credentials associated with the primary remote device 10 in the customized configuration settings. Additionally or alternatively, a connected system 100 can connect one or more primary remote devices 10 (e.g., wherein the connected system 100 can function as a network hub or repeater). The primary remote device 10 is preferably a networking device, such as a router (e.g., a wireless router), but can alternatively be a mobile device (e.g., a smart phone, tablet, laptop, computer, etc.), a second connected system 100, or be any other suitable device remote (e.g., physically disconnected from) the connected system 100.

The connected system 100 can be used with a secondary remote device 10 that functions to communicate information to and/or from the connected system 100. The information can include operation instructions, primary remote device 10 connection information (e.g., identifiers and/or credentials), or any other suitable information. The secondary remote device 10 can communicate information directly to the connected system 100, communicate information indirectly to the connected system 100 (e.g., through the primary remote device 10), or be connected to the connected system 100 in any other suitable manner. The secondary remote device 10 can be associated with one or more identifiers, such as social networking system identifiers (e.g., user-names), device identifiers, cellular service identifiers (e.g., phone number), connection identifiers (e.g., IP address), or any other suitable identifiers. The connected system 100 can store the identifiers in the customized configuration settings, wherein connected system 100 control can be selectively permitted to secondary remote devices 10 having associated identifiers stored by the connected system 100. However, the connected system 100 identifiers can be utilized in any other suitable manner. The secondary remote device 10 can additionally or alternatively be associated with a set of credentials, wherein the credentials can be used by the connected system 100 to connect to the secondary remote device 10. Alternatively, the secondary remote device 10 can store a set of credentials associated with the connected system 100, wherein connected system 100 control can be limited to secondary remote devices 10 storing the connected system 10 *o* credentials. However, the secondary remote device 10 can store or be associated with any other suitable information. The secondary remote device 10 is preferably a mobile device (e.g., a smart phone, tablet, laptop, computer, etc.), but can alternatively be a networking device, such as a router (e.g., a wireless router), a second connected system 100, or be any other suitable device remote (e.g., physically disconnected from) the connected system 100.

The reset switch 200 of the connected system 100 functions to record a user action indicative of a desire to reset or reboot the connected system 100. The reset switch 200 is preferably a physical switch, but can alternatively be an electrical switch or digital switch. The reset switch 200 is preferably operable between a first and a second state (e.g., an open and closed state, respectively), but can alternatively be operable in any other suitable number of states. The switch is preferably a toggle-type or non-momentary switch (e.g., a flip switch for continuous "on" or "off"), but can alternatively be a momentary-type switch (e.g., push for "on" or push for "off") or any other suitable switch. The switch can include a set of contacts actuated by an actuator. The actuator can be a toggle, a rocker, a rotary linkage, a push-button, or any other suitable mechanical linkage. The switch can be non-biased or biased. However, the reset switch 200 can be any other suitable mechanical switch. Alternatively, the reset switch 200 can be an electronic switch, such as a relay, analog switch, power transistor, MOSFET, or any other suitable electronic switch operable in at least a first and second mode. The reset switch 200 is preferably a single pole, single throw switch (SPST switch), but can alternatively be a single pole, double throw switch (SPDT switch), double pole, single throw switch (DPST switch), or have any other suitable contact arrangement. In one variation, the reset switch 200 is a binary switch. In a second variation, the reset switch 200 is operable in two or more modes. However, the reset switch 200 can be any other suitable switch. The reset switch 200 is preferably arranged on or accessible through the system exterior, but can alternatively be arranged on or accessible through the system interior, system end, or through any other suitable portion of the system. The reset switch 200 can be arranged along a longitudinal surface of the system, but can alternatively be arranged along a perimeter of the system (e.g., along an edge of a casing proximal the active surface of the connected system 100), an end of the system, or along any other suitable surface. The reset switch 200 can be arranged such that the switch actuates in a direction having a vector substantially parallel to the system longitudinal axis, but can alternatively be arranged such that the actuation axis is substantially perpendicular to the system longitudinal axis or arranged in any other suitable configuration.

The reset memory 220 of the connected system 100 functions to record a state (position) of the reset switch 200. The reset memory 220 preferably records the reset switch 200 state while the connected system 100 or component thereof is powered (e.g., while power is supplied to the connected system 100, light emitting elements 500, control system 400, and/or reset memory 220), but can additionally or alternatively record the reset switch 200 state while the connected system 100 or component thereof is unpowered, or record the reset switch 200 state at any other suitable time. The reset memory 220 can record the reset switch 200 state in response to detection of a change in the reset switch 200 state, record the reset switch 200 state at a predetermined frequency, record the reset switch 200 state in response to the occurrence of a record event (e.g., power provision cessation, reset memory 220 interrogation, system initiation or startup, etc.), or record the reset switch 200 state at any other suitable time. The reset memory 220 can record only the instantaneous reset switch 200 state, record both the instantaneous reset switch 200 state and one or more prior reset switch 200 states, record only the prior reset switch 200 state, or record any suitable reset switch 200 state.

The reset memory 220 is preferably non-volatile and retains its memory when power is turned off (e.g., when the reset memory 220 is unpowered), but can alternatively be volatile and maintain data only for as long as power is maintained. In the latter variation of the reset memory 220, the reset memory 220 can additionally include a separate power source that functions to supply power to the reset memory 220 when the remainder of the connected system 10 *o* is unpowered. Alternatively, the reset memory 220 can be powered by an on-board power source (e.g., the secondary power source 900) when the connected system 100 is disconnected from the external power source 30. Alternatively, the latter variation of the reset memory 220 can be unpowered and lose any stored information upon power provision cessation. Examples of non-volatile reset memory 220 include flash memory, EEPROM. F-RAM, and MRAM, and can additionally include organic memory, mechanically addressed memory, or any other suitable non-volatile memory. Alternatively, the reset memory 220 can include a CPU, microprocessor, or any other suitable computing system. The reset memory 220 is preferably read/write memory, but can alternatively be read-only, write-only, or have any other suitable characteristic. The reset memory 220 is preferably connected to the reset switch 200, more preferably constantly connected to the reset switch 200, but can alternatively be disconnected from the reset switch 200, intermittently connected to the reset switch 200, or otherwise connected to the reset switch 200. The reset memory 220 is preferably directly connected to the reset switch 200, but can alternatively be indirectly connected to the reset switch 200 (e.g., through the control system 400) or otherwise connected to the reset switch 200. The reset memory 220 can be connected to one or more terminals of the reset switch 200. The reset memory 220 can be connected to the control system 400, and/or to any other suitable connected system component.

The configuration memory 300 of the connected system 100 functions to store configuration settings. The configuration settings can include remote device identifiers, credentials associated with the identifiers (e.g., one or more network identifiers and associated passwords, secondary remote device 10 identifiers, etc.), user settings (e.g., preferred operation parameter settings), user information (e.g., social networking system account identifier and password), applications, user-assigned identifier and/or credentials for the connected system 100, or any other suitable information. The configuration settings can be received from the primary remote device 10, the secondary remote device 10, a tertiary remote device (e.g., a server system associated with the connected system 100), automatically generated (e.g., learned based on historical settings), or otherwise determined. The configuration memory 30 *o* can additionally store default settings (e.g., factory settings), which can include the operating system, initialization sequence, default connected system 100 identifier, default connected system 100 credentials, and/or any other suitable default information.

The configuration memory 300 is preferably separate and distinct from the reset memory 220, but can alternatively be a portion of the reset memory 220, be part of the same memory as the reset memory 220, or be related to the reset memory 220 in any other suitable manner. The configuration memory 300 is preferably non-volatile memory, but can alternatively be volatile memory. In the latter variation, the volatile configuration memory 300 can be selectively powered in the manner discussed above for the volatile reset memory 220, or can be powered in any other suitable manner. The volatile configuration memory 300 is preferably powered asynchronously of the volatile reset memory 220, but can alternatively be concurrently powered with the volatile reset memory 220. The volatile configuration memory 300 is preferably powered with a separate power source from the volatile reset memory 220, but can alternatively be powered with the same power source as the volatile reset memory 220. Examples of non-volatile configuration memory 300 include flash memory, EEPROM. F-RAM, and MRAM, and can additionally include organic memory, mechanically addressed memory, or any other suitable non-volatile memory. Alternatively, the configuration memory 300 can include a CPU, microprocessor, or any other suitable computing system. The configuration memory 300 is preferably read/write memory, but can alternatively be read-only, write-only, or have any other suitable characteristic. The configuration memory 300 is preferably electrically connected to the control system 40, but can alternatively or additionally be electrically connected to the communication system 600, the reset memory 220, or any other suitable connected system component.

The control system 400 of the connected system 100 functions to control connected system 100 operation (e.g., connected system component operation). The control system 400 can operate the connected system 100 in a configured mode (normal mode), wherein the connected system 100 is operated based on the configuration settings. For example, the control system 400 can operate the light emitting elements 500, the communication system 600, or any other suitable connected system component based on the configuration settings. In a specific example, when the connected system 100 includes a communication system 600, the control system 400 can control the communication system 600 (e.g., wireless communication system 600) to connect to a remote device based on the configuration settings, can receive instructions from the remote device through the communication system 600, and can control operation of the light emitting elements 500 based on the instructions. However, the control system 400 can operate the connected system 100 in the normal mode in any other suitable manner. The control system 400 can additionally or alternatively operate the connected system 100 in a reset mode (configuration mode), wherein the control system 400 erases stored configuration settings from the configuration memory 300 and executes an initialization routine or operates the connected system 100 based on the default settings. The control system 400 can additionally or alternatively operate the connected system 100 in any other suitable mode. The control system 400 can additionally function to select the operation mode. For example, the control system 400 can select the configuration mode in response to the stored reset switch 200 state differing from the instantaneous reset switch 200 state or in response to receipt of a power cycle substantially matching a predetermined power cycling pattern, and otherwise select the normal mode. The control system 400 can additionally function to distribute or otherwise control power provision to connected system components, detect whether external power is being provided to the connected system 100, or perform any other suitable functionalities. The control system 400 can be electrically connected to the reset switch 200, the reset memory 220, the configuration memory 300, the light emitting elements 500, the communication system 600, and/or any other suitable connected system component. The control system 400 can be one or more CPUs, microprocessors, microcontrollers, or any other suitable set of computing units.

The connected system 100 can be a lighting system and include a set of light emitting elements 500. The light emitting elements 500 function to emit light having properties (e.g., intensity, wavelength, saturation, color temperature, etc.) determined by the control system 400. The lighting system can include one or more light emitting elements 500. When multiple light emitting elements 500 are included, the light emitting elements 500 can be arranged in an array (e.g., rectangular array), a circle, about a system perimeter, in concentric circles, randomly, or distributed in any other suitable configuration. The light emitting element can be a light emitting diode (LED), OLED, an incandescent bulb, an RF diode, or any other suitable light emitting element. Alternatively or additionally, the system can include any other suitable EM wave emitter (e.g., electromagnet, ultrasound emitter, etc.). The light emitting element can emit visible light, RF, IR, UV, or light at any other suitable spectrum. In one variation, the set of light emitting elements 500 cooperatively emit at least 500 lumens. However, the set of light emitting elements 500 can cooperatively emit 750 lumens, 1,000 lumens, or any other suitable number of lumens. The system preferably includes at least 10 light emitting elements 500 or light emitting element clusters (e.g., each cluster including one or more light emitting diodes configured to emit different wavelengths of light), but can alternatively include a single light emitting element or cluster, at least 30 light emitting elements 500 or clusters, or any other suitable number of light emitting elements 500.

The connected system 100 can additionally or alternatively include a communication system 600, which functions to communicate information between the control system 400 and a device. The communication system 600 is preferably a wireless communication system 600, wherein the device is a remote device (e.g., the primary or secondary device), but can alternatively be a wired communication system 600 (e.g., powerline communication. Ethernet communication, etc.), wherein the device is a proximal or physically connected device. The connected system 10 *o* can include one or more communication systems 600.

The wireless communication system 600 can be a transmitter, a receiver, a transceiver, repeater, or any other suitable wireless communication system 600. The wireless communication system 600 can simultaneously be connected to one or more remote devices (e.g., one or more secondary and/or primary devices), be configured to connect to a single remote device, or be configured to connect to any other suitable number of devices. The wireless communication system 600 can connect to the devices using the configuration settings (e.g., using the credentials stored in the configuration settings), default settings, or connect to the devices in any other suitable manner. The wireless communication system 600 preferably automatically connects to the remote device, but can alternatively or additionally connect to the remote device in response to receipt of a notification from a second remote device, detection of a predetermined power cycling pattern, or in response to any other suitable trigger event. Additionally or alternatively, the remote device can connect to the wireless communication system 600 using credentials broadcast by the wireless communication system 600, credentials stored by the remote device (e.g., wherein the credentials for the lighting system were set by a remote device), or connect to the wireless communication system 600 in any other suitable manner. The wireless communication system 600 can send information to a targeted endpoint (e.g., a single device, a specified set of devices), broadcast information, function as a router or WLAN provider, or have any other suitable functionality. The wireless communication system 600 can receive information from a single endpoint, multiple endpoints (e.g., wherein the endpoints are associated or unassociated with encryption keys or other credentials), or from any other suitable information source. The wireless communication system 600 can be a short-range communication system 600 or long range communication system 600. Examples of short-range communication systems 600 that can be used include Bluetooth, BLE, RF, IR, and ultrasound, but any other suitable communication system 600 can be included. Alternatively, the light emitting elements 500 can function as the wireless communication system 600, wherein information can be controlled through light modulation or any other suitable methodology. Examples of long-range communication systems 600 that can be used include WiFi, cellular, and Zigbee, but any other suitable communication system 600 can be included. The system can include one or more communication systems 600.

The connected system 100 can additionally or alternatively include an external power connector 700 that functions to electrically connect the connected system 100 to an external power source 30. The external power connector 700 can be electrically connected to the control system 400, the reset memory 220, the configuration memory 300, the wireless communication system 600, secondary power source 900, and/or any other suitable connected system component. In one variation of the connected system 100, the external power connector 700 is directly electrically connected to the control system 400, wherein the control system 400 conditions and/or distributes power to the remaining connected system components. In another variation of the connected system 100, the external power connector 700 is electrically connected to individual connected system components. However, the connected system 100 can be wired in any other suitable manner. The external power connector 700 can be a lightbulb base (e.g., Edison screw base, bayonet style base, bi-post connector, wedge base, lamp base, etc.), a plug, socket, power connector (e.g., AC power plug, DC connector, NEMA connector, etc.), or any other suitable form of electrical connector. The external power connector 700 is preferably arranged along the exterior of the connected system 100, but can alternatively be recessed within the body of the connected system 100. The external power connector 700 is preferably arranged along an end of the connected system 100 (e.g., along an end distal the light emitting elements 50 *o* in a lighting system), but can alternatively be arranged along a side of the connected system 100 or along any other suitable portion of the connected system 100.

Figure 8:
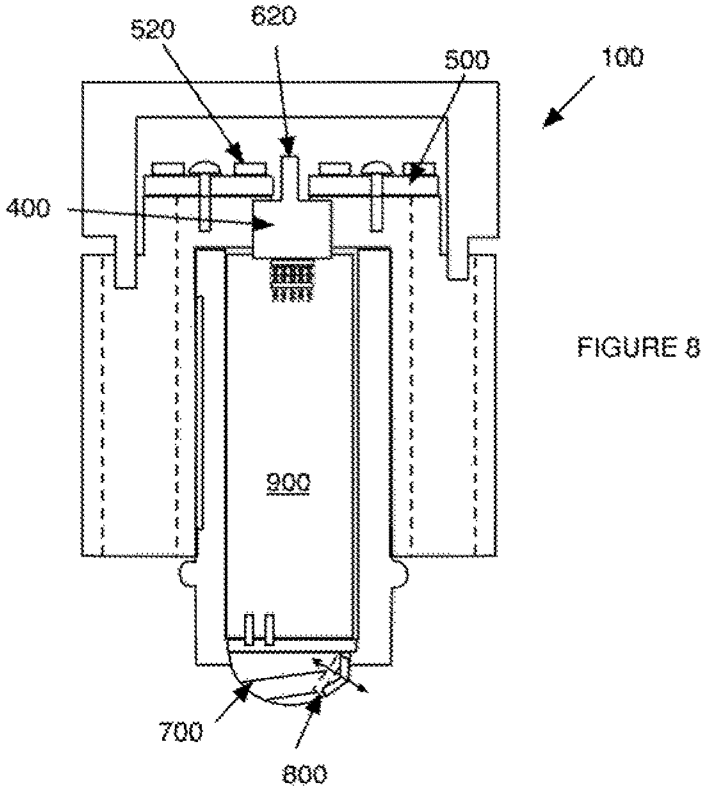
FIG. 8 is a cutaway view of an example of the lighting system.

The connected system 100 can additionally or alternatively include a connection indicator Boo that functions to detect external power connector 700 connection with a power fixture 40, as shown in FIG. 8. The connection indicator 800 can be operable between a connected mode when the external power connector 700 is connected to a power fixture 40 and a disconnected mode when the external power connector 700 is disconnected from the power fixture 40, or can be operable between any other suitable set of modes. The connection indicator Boo can be a physical switch (e.g., biased in the open direction associated with the disconnected mode when physically decoupled from the power fixture 4 *o*), electromagnetic switch (e.g., a ferrous material or wire winding configured to detect an applied electromagnetic field when the external power connector 700 is connected to the power fixture 40, etc.), or be any other suitable detection mechanism. The connection indicator Boo can be arranged proximal the external power connector 700, along the external power connector 700 (e.g., along the side or end of the external power connector 700), distal the external power connector 700, or be arranged in any other suitable position.

The connected system 100 can additionally or alternatively include a secondary power source 900 that functions to provide power to the connected system components. The secondary power source 900 can additionally function to condition external power for connected system components, supply power for standby operation (e.g., power a battery management system when the connected system 100 is otherwise unpowered), or perform any other suitable functionality. In a first variation, the secondary power source 900 provides power to the connected system components when the connected system 100 is electrically connected to the external power source 30. In a second variation, the secondary power source 900 provides power to all connected system components when power from the external power source 30 has ceased (e.g., when the connected system 100 is physically disconnected from the power fixture 4 *o*, when power provision from the external power source 30 to the fixture is terminated, etc.). In a third variation, the secondary power source 900 provides power to a select set of connected system components (e.g., the reset memory 220) when power from the external power source 30 has ceased (e.g., wherein the secondary power source 900 is only connected to the select set of connected system components or is connected to more than the select set of connected system components). In a fourth variation, the secondary power source 900 provides power to the connected system components in response to the occurrence of a trigger event, such as receipt of an emergency signal from a remote device, determination that external power provision ceased but the power switch 50 is in the open position, or any other suitable trigger event. The secondary power source 900 can be electrically connected to all connected system components, a subset of connected system components, or any other suitable set of connected system components. The secondary power source 900 is preferably electrically connected to and charged by the external power connector 700, but can alternatively be electrically disconnected and/or substantially isolated from the external power connector 700. The secondary power source 900 can be substantially permanently connected to the connected system components, selectively connected to the connected system components, or otherwise connected to the connected system components. The connected system 100 can include one or more secondary power sources 900, wherein multiple secondary power sources 900 can be connected to the same connected system components or to different connected system components. Alternatively, the connected system 100 can lack or exclude secondary power sources 900. The secondary power source 900 can be a secondary (rechargeable) battery (e.g., having lithium chemistry, nickel chemistry, cadmium chemistry, magnesium chemistry, platinum chemistry, etc.), a fuel cell system, a solar cell system, a piezoelectric system, or any other suitable source of power.

The connected system 100 can additionally or alternatively include toggle detector 230 that functions to record (e.g., count) a recorded power pattern 236 reflecting the number of times external power provision to the connected system 100 has been cycled (e.g., turned on and off, switched between high and low power, etc.). The recorded power pattern 236 can be subsequently analyzed in light of a set of stored power feature patterns 234, wherein a connected system operation mode can be selected based on whether the recorded power pattern 236 substantially matches a power feature pattern 234. However, the recorded power pattern 236 can be otherwise used. The toggle detector 230 is preferably electrically connected to the external power connector 700, but can alternatively or additionally be electrically connected to the control system 400 or any other suitable connected system component. The recorded power pattern 236 is preferably recorded in the reset memory, but can alternatively be recorded in any other suitable memory. For example, a cycle count stored in the reset memory 220 or any other suitable memory can be increased each time the external power is provided to the system, each time the external power is removed from the system, each time the external power is provided then removed within a predetermined period of time, or in response to any other suitable trigger event. The recorded power pattern 236 can be stored with a timestamp (e.g., universal or relative) or stored without a timestamp. The recorded power pattern 236 can be erased at a predetermined frequency (e.g., every 10 minutes), erased in response to the occurrence of an erase event (e.g., execution of a configuration routine), be persistent, or edited in any other suitable manner. In one variation, the toggle detector 230 includes a winding connected to the external power connector 700 or a transistor (e.g., MOSFET) connected therebetween, a set of resistor voltage dividers, a rectifier diode, and a filter capacitor. The diode can rectify the AC voltage of the power from the external power connector 700, the resistor voltage dividers can divide the rectified bias AC voltage, and the capacitor can filter out voltage ripple. The diode, voltage divider, and capacitor can cooperatively monitor whether bias AC voltage is applied across the winding, wherein bias AC voltage will be applied when external power is supplied to the external power connector 700, and bias AC voltage will not be applied to the winding when the external power connector 700 is unpowered. In a second variation, the toggle detector 230 can include a rising edge detector and/or falling edge detector connected to the external power connector 700. However, the toggle detector 230 can include any other suitable circuitry configured to determine when external power is provided and/or removed from the connected system 100.

The connected system 100 can additionally include a set of sensors 520 that function to measure ambient environment parameters, system parameters, or any other suitable set of parameters. Examples of parameters that can be measured include ambient light (e.g., visible light, IR, etc.), ambient sound (e.g., audio, ultrasound, etc.), ambient temperature, ambient pressure, geographic location, system temperature, system voltage, system current, system operating time, system position, and system acceleration, but any other suitable parameter can be measured. The connected device can include one or more sensors or types of sensors. The set of sensors 520 can include a light sensor (e.g., camera), sound sensor (e.g., microphone, ultrasound sensor), accelerometer, gyroscope, GPS, or any other suitable sensor.

2. Method.

Figure 1:
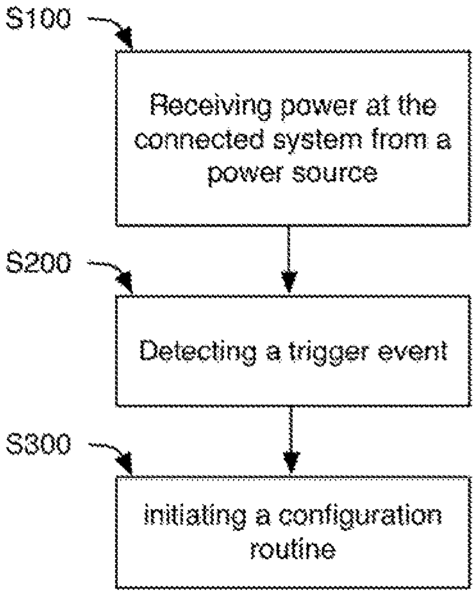
FIG. 1 is a flowchart diagram of the method of resetting a connected system.

As shown in FIG. 1, the method of resetting the connected system includes receiving power at the connected system from a power source S100, detecting a reset trigger event S200, and initiating a configuration routine in response to detection of the reset trigger event S300. The method functions to reset the connected system without receiving reset instructions from a remote device. The method is preferably performed by the system 100 disclosed above, but can alternatively be performed by any other suitable connected system.

Figure 2:
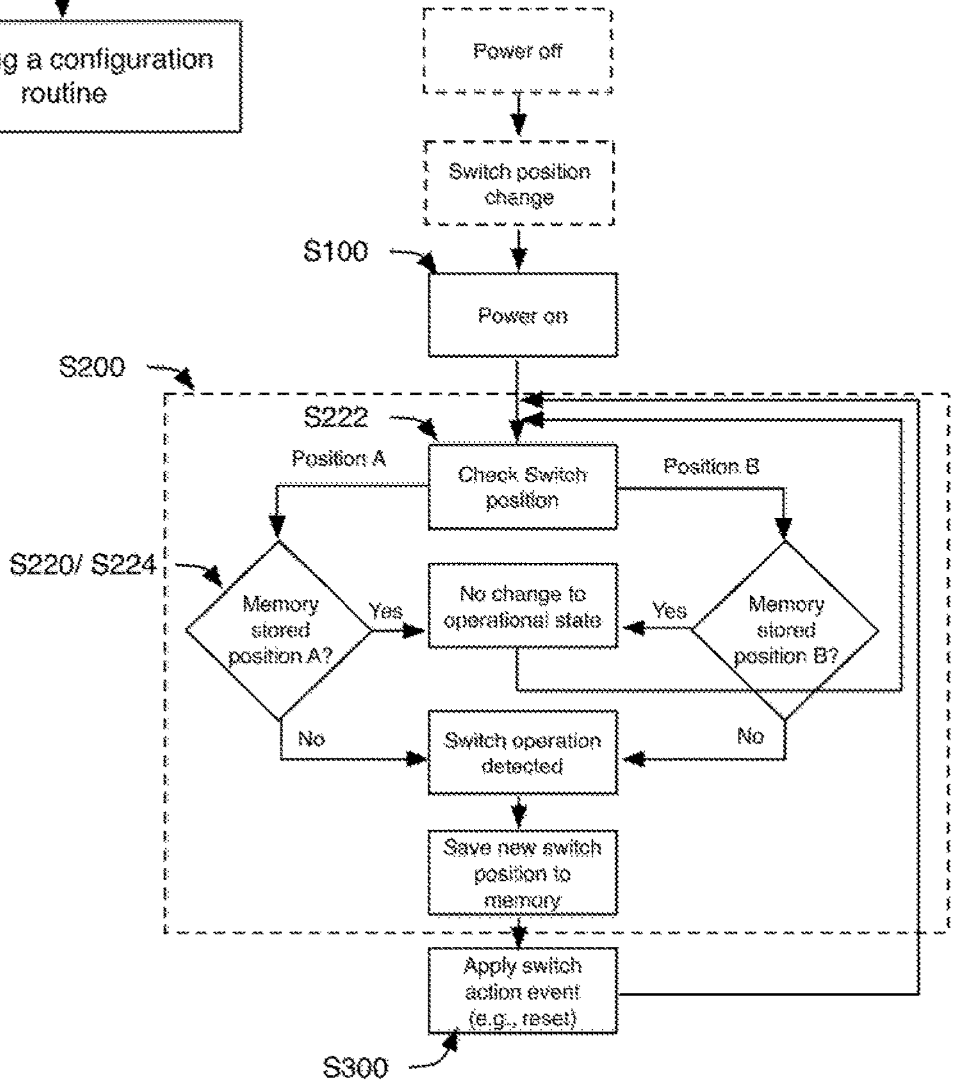
FIG. 2 is a flowchart diagram of a first variation of the method.
Figure 11:
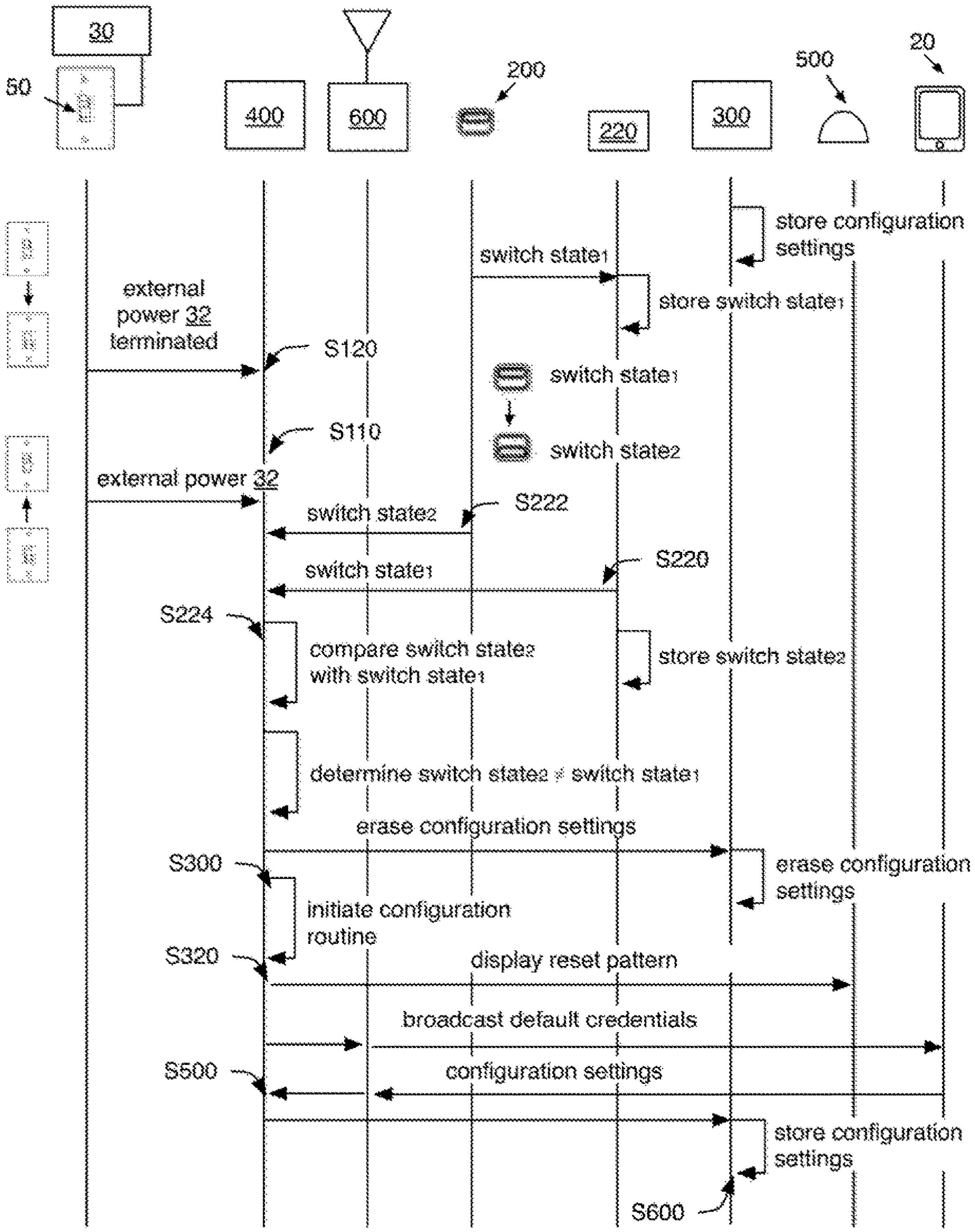
FIG. 11 is a schematic representation of a first example of the method, including initiating a configuration routine in response to detection of reset switch toggling.

In a first variation, examples of which are shown in FIGS. 2 and 11, the method includes receiving power at the connected system from a power source S100, interrogating reset memory for a stored reset switch state S220, determining an instantaneous reset switch state S222, comparing the stored reset switch state with the instantaneous reset switch state S224, operating the connected system in the reset mode by initiating a configuration routine in response to the stored reset switch state differing from the instantaneous reset switch state S300, and operating the connected system in the configured mode in response to the stored reset switch state matching the instantaneous reset switch state S400. In this variation, the method can detect the reset trigger event even though the system is disconnected from power when the reset switch state is switched. This can enable a user to trigger a master reset of the system by removing the connected system from the power fixture such that the system is unpowered by external power, switching the reset switch state, reconnecting the connected system to the power fixture, and supplying external power to the connected system.

Figure 3:
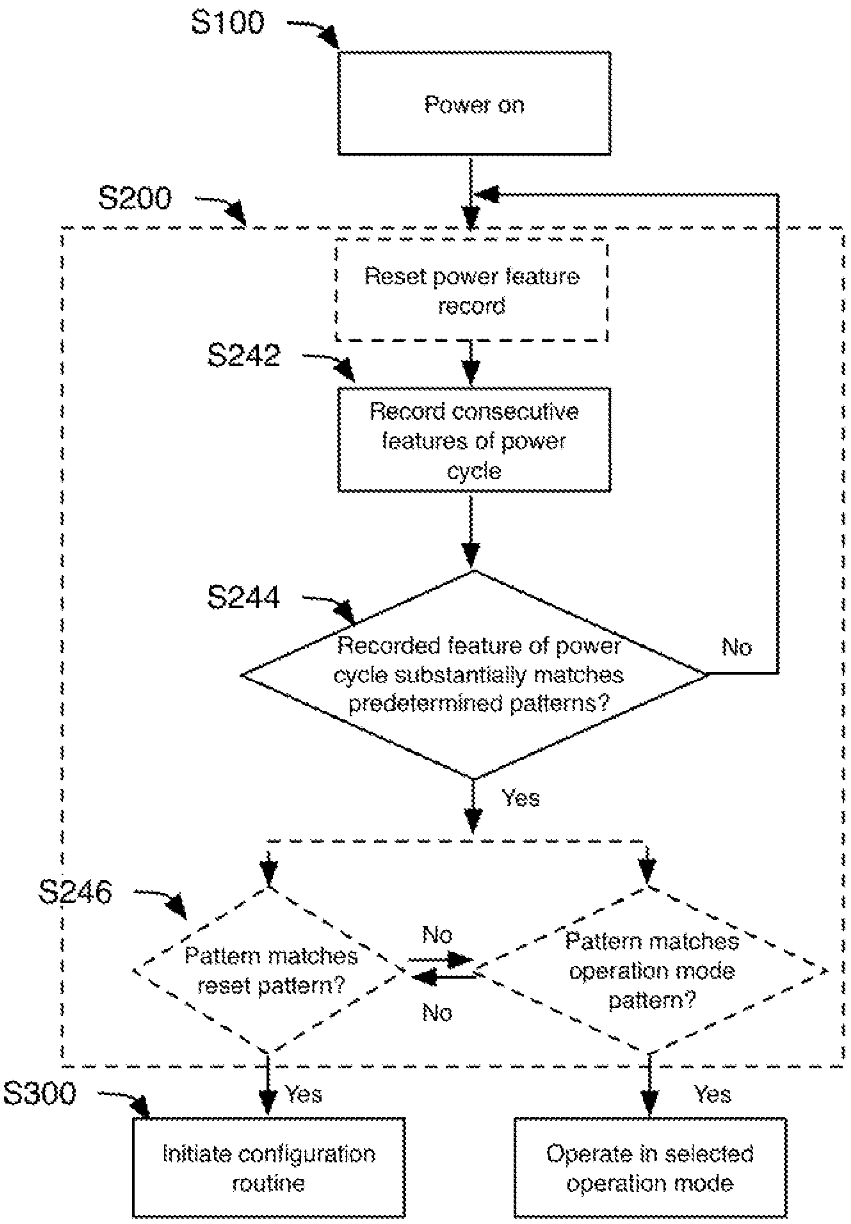
FIG. 3 is a flowchart diagram of a second variation of the method.

In a second variation, an example of which is shown in FIG. 3, the method includes receiving power at the connected system from a power source S100, detecting a pattern of external power supply to the connected system within a predetermined time period S240, and operating the connected system in the reset mode by initiating a configuration routine in response to the detected pattern substantially matching a predetermined reset pattern S300, and operating the connected system in the configured mode in response to the stored reset switch state substantially differing from the predetermined reset pattern S400. In this variation, the method can enable the user to substantially simultaneously reset or reboot a set of connected systems (e.g., one or more connected systems) electrically connected to the same power circuit without physically accessing each connected system. However, the method can include any other suitable reboot or reset method.

Receiving power at the connected system S100 from a power source functions to initiate trigger event monitoring. Receiving power at the connected system can additionally function to provide power to the connected system components. The power source is preferably an external power source (e.g., a power grid or power system), but can alternatively be an internal power source (e.g., the secondary power source) or any other suitable power source. In variations of the method wherein the power is received from the internal power source, the internal power source can power the connected system components only when the connected system is physically connected to an external power source, power the connected system components irrespective of connected system physical or electrical connection to the external power source, or supply power to the connected system components at any other suitable time. Receiving power can include detecting applied power at the connected system. Detecting power at the connected system can include determining that the current through a connection system component exceeds a baseline current, determining that the voltage across a connection system component exceeds a baseline voltage, or sensing supplied power in any other suitable manner.

Receiving power at the connected system from a power source S100 can include detecting initial power receipt at the connected system S110. Detecting initial power receipt can include detecting the rising edge of a power curve with a rising edge detector. Detecting initial power receipt can additionally or alternatively include detecting a pattern of power termination then power supply. Detecting power termination can include detecting a falling edge of the power curve, determining that the current through a connection system component falls below a current threshold, determining that the voltage across a connection system component falls below a baseline voltage, or determining power cessation or supplied power drop in any other suitable manner. Detecting supplied power can include detecting the rising edge of a power curve, determining that the current through a connection system component exceeds a baseline current, determining that the voltage across a connection system component exceeds a baseline voltage, or determining supplied power in any other suitable manner. However, initial power receipt can be detected in any other suitable manner.

Receiving power at the connected system S100 can additionally include detecting physical system connection to an external power source. Detecting physical connected system connection to an external power source can be used to determine whether the secondary power source should be controlled to power the connected system components, or be used in any other suitable manner. For example, the secondary power source can be electrically connected to the system components in response to physical connected system connection to the external power source. In another example, the secondary power source can be electrically disconnected from the system components in response to physical connected system connection to the external power source. However, the physical system connection detection can be otherwise used.

Detecting physical system connection to an external power source preferably includes detecting physical system connection to a power fixture, but can alternatively include detecting external power provision to the connected system or be detected in any other suitable manner. In a first variation, detecting physical system connection to an external power source includes detecting actuation of the connection indicator (e.g., depression of a connection indicator switch, etc.). In a second variation, detecting physical system connection to an external power source includes detecting completion or closure of a circuit that is open when the system is disconnected from the power fixture, and closed when the system is connected to the power fixture. However, physical system connection to an external power source can be otherwise detected.

Receiving power at the connected system S100 can additionally include detecting physical lighting system disconnection from the external power source. Detecting physical lighting system disconnection from an external power source can be used to determine whether the secondary power source should be controlled to power the connected system components, or be used in any other suitable manner. For example, the secondary power source can be electrically connected to the system components in response to physical connected system disconnection from the external power source. In another example, the secondary power source can be electrically disconnected from the system components in response to physical connected system disconnection from the external power source. However, the physical system disconnection detection can be otherwise used.

Detecting physical system disconnection from an external power source preferably includes detecting physical system disconnection from a power fixture, but can alternatively include detecting cessation of external power provision to the connected system, or be detected in any other suitable manner. In a first variation, detecting physical system disconnection from an external power source includes detecting actuation of the connection indicator (e.g., depression of a connection indicator switch, etc.). In a second variation, detecting physical system disconnection from an external power source includes detecting the opening or disconnection of a circuit that is closed when the system is connected to the power fixture. However, physical system disconnection from an external power source can be otherwise detected.

Receiving power at the connected system S100 can additionally include detecting termination of power supplied from the power source S120. The power supply termination or disconnection can be detected for a connected system component (e.g., the reset memory, the configuration memory, the control system, the communication system, etc.), a set of connected system components, the entire connected system, or for any other suitable combination of connected system components. The power source is preferably the external power source, but can alternatively or additionally be the secondary power source or any other suitable power source.

Receiving power at the connected system S100 can additionally include storing a reset switch state prior to power supply termination in the reset memory S700, which functions to store the reset switch state prior to system power down, such that the reset switch state can be retrieved and compared after the system is powered. The reset switch state is preferably determined and initially stored when the connected system is powered, but can alternatively be determined and/or stored when the connected system is unpowered. In one example, the reset switch state can be determined and stored only when external power is supplied to the connected system. The reset switch state is preferably retained (e.g., stored) while the reset memory and/or connected system is unpowered, wherein the reset memory is preferably non-volatile memory or be volatile memory including a power source, but can alternatively be erased once the reset memory is unpowered. The reset switch state can be stored in response to the occurrence of a storage event or stored at any other suitable time. The storage event can be the satisfaction of a predetermined period of time (e.g., wherein the reset switch state is determined and/or stored at a predetermined frequency), the comparison of the instantaneous reset switch state and a prior switch state, a reset switch state change, receipt of a state storage request, the execution of a configuration routine, or be any other suitable storage event.

Detecting a reset trigger event S200 functions to identify when the reset or reboot routine should be executed. The reset trigger event is preferably detected by the control system, but can alternatively be detected by a dedicated trigger event detection module, or by any other suitable component.

In a first variation of the method, the reset trigger event is the determination that a prior reset switch state is different from the instantaneous switch state. The determination can be made in response to detection of a reset switch state change (e.g., the pulse received from reset switch, when the system is powered), in response to a comparison between the instantaneous reset switch state and a prior reset switch state stored in the reset memory (e.g., wherein the prior reset switch state was stored a predetermined period of time beforehand, stored before the system was powered off then powered on, or stored at any other suitable time), or determined in any other suitable manner. In this variation, the method can include interrogating the reset memory for the stored reset switch state S220, determining an instantaneous reset switch state S222, and comparing the stored reset switch state and the instantaneous reset switch state S224, but can alternatively include any other suitable process.

Interrogating the reset memory for the stored reset switch state S220 functions to determine the prior reset switch state. The prior reset switch state can be the reset switch state before initial power supply to the system was detected, the state that the reset switch was in the last time the reset switch state was checked, or be the reset switch state at any other suitable time. The stored reset switch state is preferably retrieved or referenced from the reset memory, but can alternatively be requested (e.g., received in response to a sent request) or otherwise determined. The reset memory is preferably interrogated for the prior switch state during system initiation (e.g., power up, in response to initial power receipt, etc.), but can alternatively be interrogated in response to power receipt, at a predetermined frequency, in response to a storage trigger event, or interrogated at any other suitable time. The reset memory is preferably interrogated by the control system, but can alternatively be interrogated by any other suitable component.

Determining an instantaneous reset switch state S222 functions to determine the current reset switch state for comparison with the prior reset switch state. The instantaneous reset switch state is preferably determined by the control system (e.g., by interrogating the reset switch), but can alternatively be determined by any other suitable system. The instantaneous reset switch state is preferably determined from the reset switch, but can alternatively be determined (e.g., retrieved or received) from an intermediary reset switch system or from any other suitable source. In one example, the instantaneous reset switch state can be received from the reset memory, wherein the reset memory stores both the last reset switch state (e.g., instantaneous reset switch state) and the prior reset switch state. However, the instantaneous reset switch state can be otherwise determined. The instantaneous reset switch state is preferably determined during system initiation (e.g., power up, in response to initial power receipt, etc.), but can alternatively be determined in response to power receipt, at a predetermined frequency, in response to a storage trigger event, or determined at any other suitable time.

Comparing the stored reset switch state and the instantaneous reset switch state S224 functions to determine whether there was a change in the reset switch state. In particular, comparing the prior and instantaneous reset switch states can function to determine whether the reset switch was toggled while the connected system was unpowered. The prior and instantaneous reset switch states are preferably compared by the control system, but can alternatively be compared by the reset memory, reset switch system, or any other suitable system. The prior and instantaneous reset switch states are preferably compared during system initiation (e.g., power up, in response to initial power receipt, etc.), but can alternatively be compared in response to power receipt, at a predetermined frequency, in response to a storage trigger event, or compared at any other suitable time. Comparing the prior and instantaneous reset switch states can include determining the difference between the prior and instantaneous reset switch states, estimating, measuring, noting the similarity or dissimilarity between the stored and instantaneous states, or otherwise comparing the prior and instantaneous reset switch states.

The comparison can additionally function to trigger different routines. For example, a configuration routine can be initialized in response to a mismatch between the prior and current reset switch states, while a configured or normal routine can be initialized in response to a match between the prior and current reset switch states.

The comparison can be power transition dependent or independent. In an example of the former, a master reset routine can be initialized in response to a mismatch between the prior and instantaneous reset switch states, wherein the prior and instantaneous reset switch states bound an initial power provision event, a restart routine can be initialized in response to mismatch between the prior and instantaneous reset switch states, wherein the prior and instantaneous reset switch states do not bound an initial power provision event, and a configured or normal routine can be initialized in response to a match between the prior and current reset switch states. In an example of the latter, a master reset routine can be initialized in response to a mismatch between the prior and instantaneous reset switch states, irrespective of whether the prior and current reset switch states bound an initial power provision event, while a configured or normal routine can be initialized in response to a match between the prior and current reset switch states.

The comparison can be time- or history-independent, or be time- or history-dependent. In an example of the former, the master reset routine can be initialized each time the prior and current reset switch states differ. In an example of the latter, the master reset routine can be initialized when the prior and current reset switch states differ, in addition to the prior reset switch state remaining substantially constant for a predetermined period of time (e.g., based on timestamps associated with the prior reset switch state), while the master reset routine will not be initialized when the prior and current reset switch states differ, but the prior reset switch state had changed within the predetermined period of time. In another example of the latter, the master reset routine can be initialized in response to determination that the prior and current reset switch states differ, and that an initial power provision event occurred between the timestamps associated with the prior and current reset switch states, respectively, while a restart routine can be initialized in response to determination that the prior and current reset switch states differ, but an initial power provision event did not occur between the associated timestamps. However, the comparison can trigger any other suitable system operation.

In a second variation of the method, the reset trigger event is the determination that a pattern of power provision to the connected system substantially meets a predetermined reset pattern. The power monitored for the pattern is preferably external power, but can alternatively be internal power (e.g., supplied by the secondary power source). For example, the system can determine that a system on/off pattern substantially matches a predetermined on/off pattern associated with a reset routine. The power provision is preferably monitored while the connected system is substantially continuously physically connected to the power fixture (e.g., the connection indicator indicates that the connected system is connected to the power fixture), but can alternatively be monitored when the connected system is intermittently physically connected to the power fixture (e.g., wherein the connected system is physically removed from the power fixture in between consecutive power cycle feature recordations), or monitored over any other suitable time period. This variation can include recording power transition events S242, analyzing the pattern of power transition events S244, and performing one of a set of operations based on the power transition event pattern S246, but can alternatively include any other suitable process.

Recording the power transition events S242 functions to monitor a feature of the power cycle (power feature pattern), and can include increasing a counter in response to detection of a rising or falling edge of a power curve, increasing a counter in response to detection of applied voltage across the system or current through the system, or monitoring the power transition events in any other suitable manner. The power transition events can be detected by the toggle detector, control system, or other system. The power transition events can be recorded by the reset memory, the control system, configuration memory, or any other suitable memory.

Figure 9:
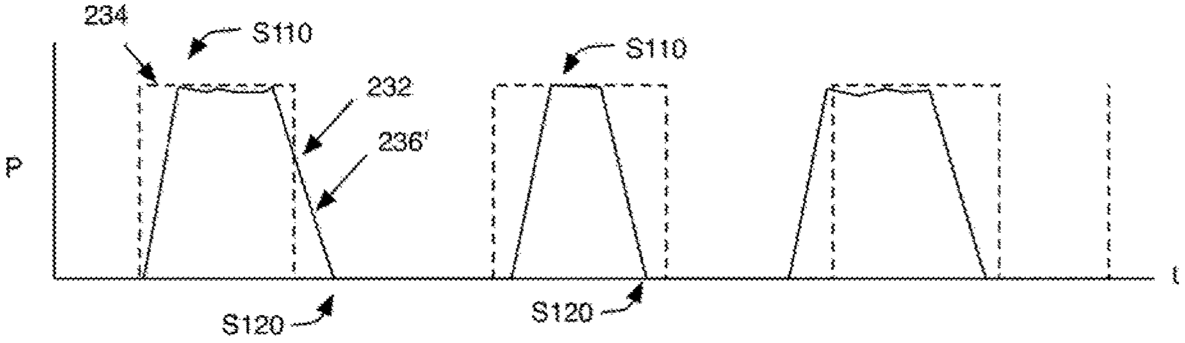
FIG. 9 is a schematic representation of a first recorded power pattern 236' substantially matching a power feature pattern.
Figure 10:
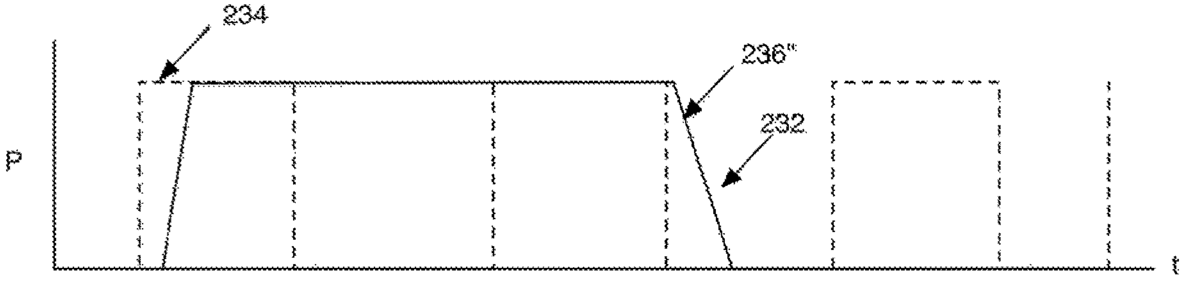
FIG. 10 is a schematic representation of a mismatch between a second recorded power pattern 236" and a power feature pattern.

Analyzing the pattern of power transition events S244 can include comparing the recorded pattern with a predetermined pattern, overlaying the recorded pattern over a predetermined pattern, or otherwise analyzing the pattern of power transition events. A recorded pattern preferably substantially matches a predetermined pattern when the recorded pattern falls within a predetermined percentage or standard deviation of the predetermined pattern (e.g., an example of which is shown in FIG. 9), and does not match the predetermined pattern when the recorded pattern deviates beyond a threshold deviation from the predetermined pattern (e.g., an example of which is shown in FIG. 10), but can alternatively substantially match or not match the predetermined pattern in any other suitable manner. The recorded pattern can be analyzed for one or more predetermined patterns.

Figure 13:
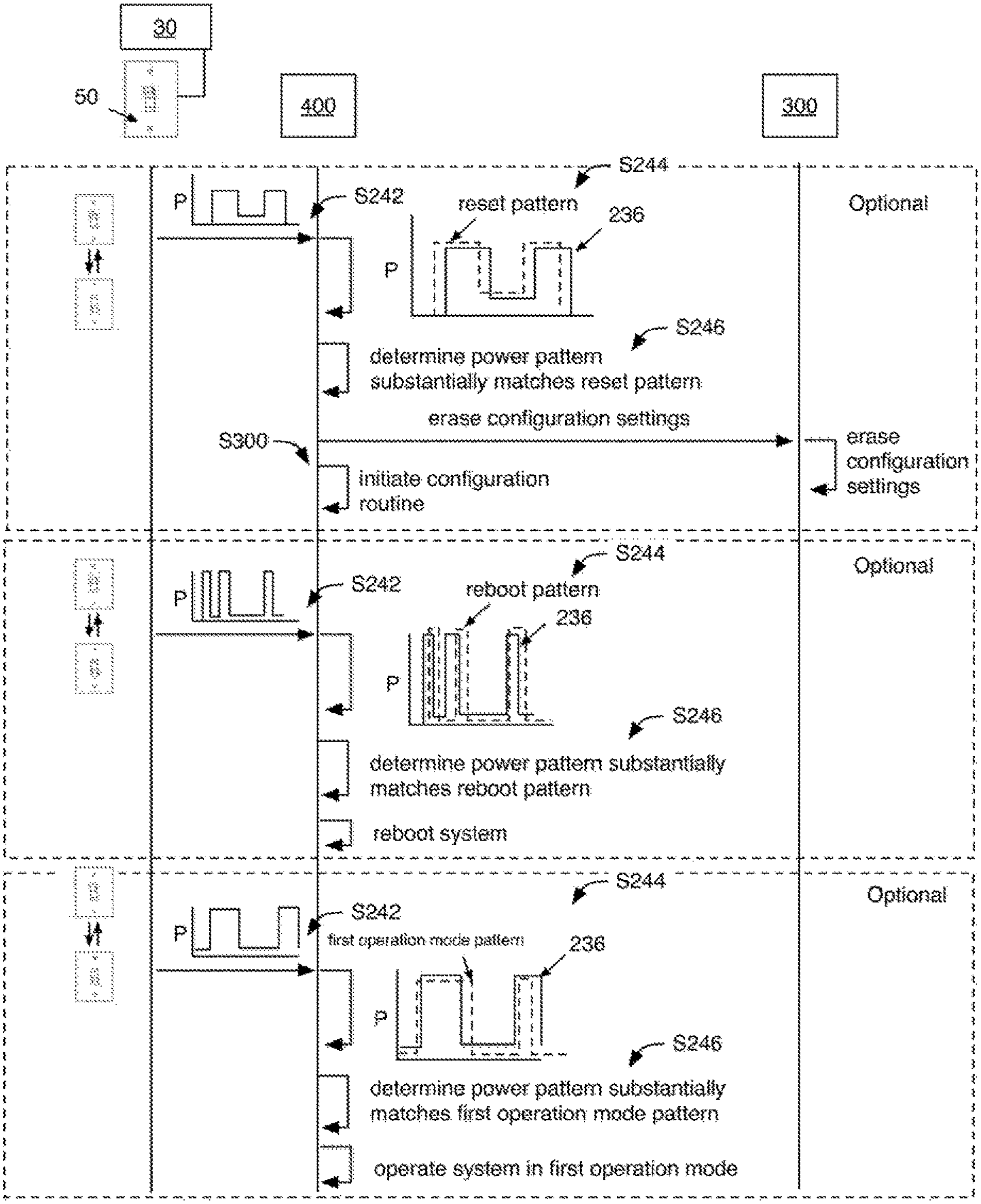
FIG. 13 is a schematic representation of a first, second, and third example of operating the connected system based on a pattern of external power provision, respectively.

Performing one of a set of operations based on the power transition event pattern S246 can include selecting an operation from a set of predetermined operations based on the determined pattern and controlling the system to execute the selected operation, examples of which are shown in FIG. 13. The operation is preferably selected and/or performed by the control system, but can alternatively be selected and/or performed by any other suitable component.

When the set of operations include multiple operations, a different power transition event pattern is preferably associated with each operation, wherein different power transition event patterns preferably have different pattern parameters. Pattern parameters can include the duration of the pattern (e.g., how long the power transition events should be monitored for), a minimum, maximum, average, or mean duration of time between each power transition event (e.g., the duration that the external power should be supplied, the duration that the external power should be shut off etc., such as a pattern including power provision for 30 seconds, power shutoff for 30 seconds, and power provision for 30 seconds), a power transition event frequency, a power transition event amplitude (e.g., patterns in the voltage or current magnitude supplied to the system), or include any other suitable parameter. The patterns associated with each operation can be determined by a manufacturer, received from a remote device (e.g., wherein the pattern is associated by a user), received from the external power source in response to receipt of a pattern association notification, or determined in any other suitable manner.

In a first specific variation, the connected system records a pattern of intermittent external power supply to the connected system, compares the recorded pattern to a predetermined power cycling pattern, and initializes the reset routine in response to the recorded power provision pattern substantially matching the predetermined power cycling pattern.

In a second specific variation, the connected system records a pattern of intermittent external power supply to the connected system. The control system initializes the reset routine in response to the recorded pattern substantially matching a first predetermined power cycling pattern, initializes a restart routine in response to the recorded pattern substantially matching a second predetermined power cycling pattern different from the first predetermined power cycling pattern, and operates the connected system in a different operation mode in response to the recorded pattern substantially matching a second predetermined power cycling pattern different from the first and second predetermined power cycling patterns. In one example, the different operation mode can be a different lighting scene wherein the light emitting elements emit light having a different parameter from that previously emitted.

In a third variation, the reset or reboot trigger event can be the receipt of a notification (e.g., a reset notification, reboot notification, etc.) or other communication from a remote device. In a fourth variation, the reset or reboot trigger event can be the detection of a signal received at a sensor. For example, the trigger event can include detecting an audio pattern substantially matching a predetermined audio pattern (e.g., received at a microphone), a sound pattern substantially matching a predetermined sound pattern (e.g., received at a transducer or other sound sensor), a vibration pattern substantially matching a predetermined vibration pattern (e.g., a tapping or knocking pattern on the connected system, received at a vibration sensor), a light pattern substantially matching a predetermined light pattern, or detection of any other suitable signal input associated with the reset or reboot operation. In a fifth variation, the reset or reboot trigger event can be the detection of an error in system operation. However, the reset trigger event can be any other suitable event indicative of a request to reset the system.

Initiating a reset routine (configuration routine) S300 functions to perform a master reset on the system. The reset routine is preferably initiated and performed by the control system, but can alternatively be initiated and/or performed by the communication system or any other suitable component. The reset routine is preferably initiated in response to trigger event detection, but can alternatively be performed at any other suitable time. Performing the reset routine can include erasing information from the connected system and initiating an initializing routine. Erasing information from the connected system can include erasing all information on the device except the default settings, erasing the configuration settings from the configuration memory, or erasing any other suitable information from the system.

Performing the initializing routine functions to enable device connection to the connected system. The initializing routine is preferably performed by the control system, but can alternatively be performed by any other suitable component. The initializing routine can be automatically performed in response to determination that the prior reset switch position differs from the instantaneous reset switch position, in response to determination that the power cycling pattern substantially matches a predetermined pattern, performed as part of the configuration routine, performed in response to determination that no configuration settings are stored, performed in response to power provision to the connected system after the configuration settings have been erased, or be performed at any other suitable time. Performing the initializing routine preferably includes operating the system based on the default settings stored by the system, but can alternatively or additionally include retrieving default settings from a remote system (e.g., remote server system) and operating the system based on the retrieved settings, or operating the system in any other suitable manner.

In one variation, performing the initializing routine includes broadcasting a default system identifier and/or credentials, receiving a connection request from a remote device (e.g., secondary remote device, such as a user device), wherein the connection request can include the broadcast information (e.g., default system identifier and/or credentials), verifying the received information, sending a connection verification to a remote device, wherein the remote device can be the remote device from which the connection request was received or a different remote device, receiving a set of configuration settings, and storing the set of configuration settings. The set of configuration settings can include a set of remote device identifiers and respective credentials, wherein the set of remote device identifiers and respective credentials are preferably primary remote device identifiers and credentials, but can alternatively be secondary remote device identifiers, secondary remote device credentials, secondary connected system identifiers, secondary connected system credentials, and/or be any other suitable set of configuration settings. The configuration settings are preferably received after the connection verification is sent, wherein the remote device receives the connection verification and prompts the user for configuration setting entry. Alternatively, the remote device can automatically determine the configuration settings (e.g., retrieve the configuration settings from remote device memory) and send the configuration settings to the connected system. However, the configuration settings can be otherwise obtained.

Performing the initializing routine can additionally include providing a visual or audio indicator to a user S320, which functions to notify the user that the connected system is undergoing an initializing routine. In one example, the visual indicator can include controlling the light emitting elements to display a reset notification sequence including predetermined light pattern (e.g., red, green, blue, white). In a second example, the audio indicator can include controlling a speaker to emit a predetermined tone or set of tones. In a third example, the connected system can broadcast a reset notification to remote devices. However, the system can be initialized in any other suitable manner.

The method can additionally include operating the connected system based on the configuration settings S400, which functions to operate the connected system based on user preferences. The connected system is preferably operated based on the configuration settings (e.g., in the normal mode) by the control system, but can alternatively be performed by any other suitable component. The connected system can be automatically operated based on the configuration settings in response to determination that the trigger event has not occurred, but can be operated based on the configuration settings at any other suitable time. The connected system can be operated based on the configuration settings in response to determination that the prior reset switch position substantially matches the instantaneous reset switch position, in response to determination that the power cycling pattern differs from a predetermined pattern, in response to determination that configuration settings are stored by the connected system, in response to power provision to the connected system, in response to determination of a trigger event non-occurrence, or operated in the normal mode at any other suitable time. Operating the connected system based on the configuration settings can include operating the connected system according to the configuration settings (e.g., operating the light emitting elements according to instructions or parameter settings stored in the configuration settings), operating the connected system using the configuration settings (e.g., connecting to a remote device using an identifier and credentials stored in the configuration settings), or operating the connected system based on the configuration settings in any other suitable manner.

In one example, operating the lighting system based on the configuration settings S400 can include retrieving operating instructions from the configuration settings and controlling the light emitting elements according to the operating instructions.

Figure 12:
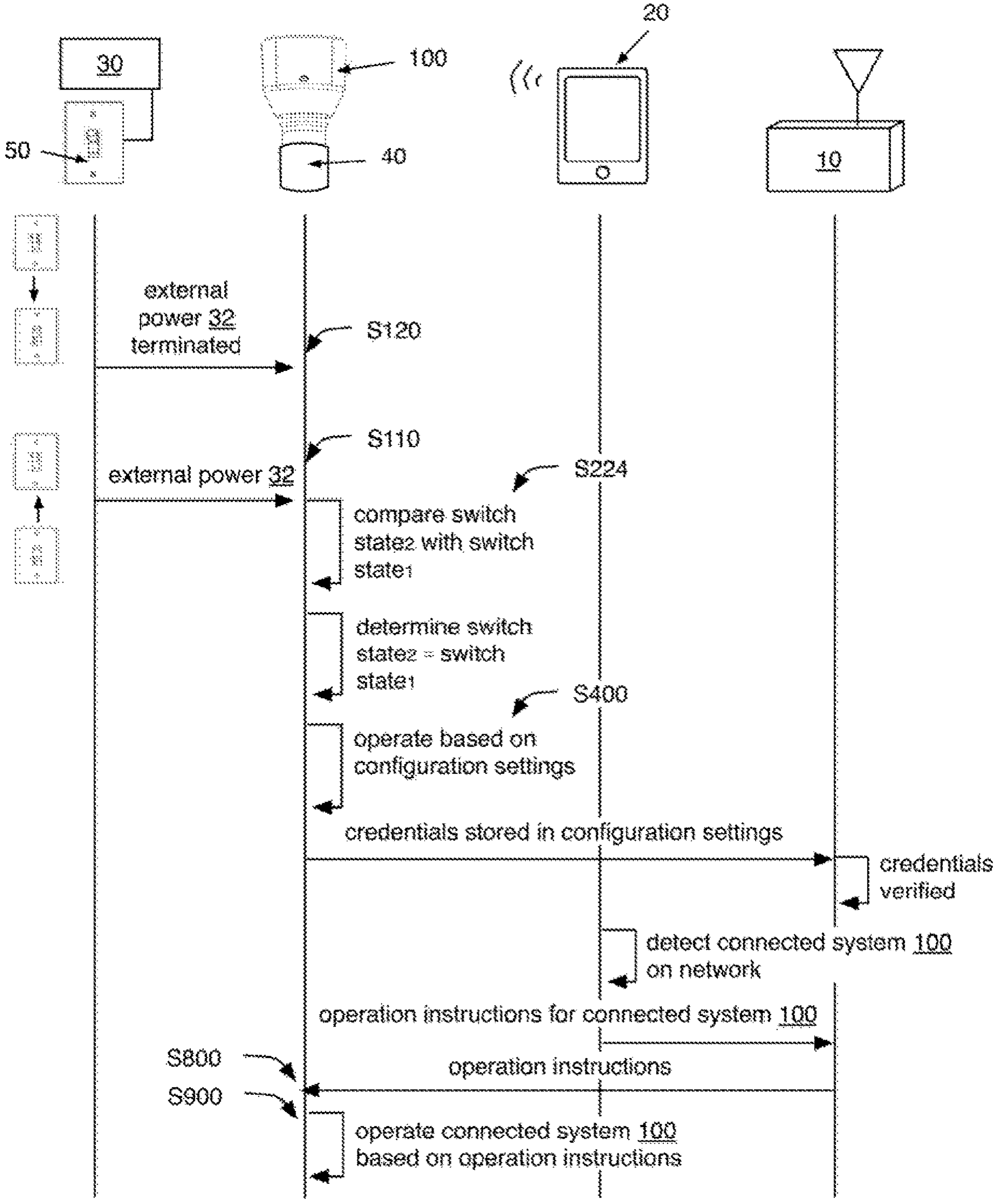
FIG. 12 is a schematic representation of a second example of the method, including operating the connected system based on the configuration settings and operating the connected system based on operating instructions received from a remote device.

In a second example, as shown in FIG. 12, operating the lighting system based on the configuration settings S400 can include connecting the connected system to a remote device (e.g., primary remote device or secondary remote device) using the respective remote device identifier and credentials (e.g., encryption keys) stored in the configuration settings, receiving operating instructions from the remote device S800, and controlling system operation based on the operating instructions S900. This method can be performed by the control system using the communication system, or be performed by any other suitable component. The connected system can simultaneously connect to a single remote device, multiple remote devices, or any suitable number of remote devices. Controlling system operation based on the operating instructions can include controlling light emitting element operation (e.g., controlling the emitted light parameters), controlling communication system operation (e.g., controlling which remote devices the system connects to, communication system connection permissions, etc.), controlling data processing (e.g., controlling data compression, encryption, transmission channels, endpoints, etc.), or controlling any other suitable aspect of connected system operation based on the information received from the remote device. A second set of configuration settings can additionally or alternatively be received from the remote device, wherein the second set of configuration settings can overwrite the first set of configuration settings or be stored with the first set of configuration settings.

In a first specific example, operating the lighting system based on the configuration settings can include connecting the connected system to a wireless router using credentials stored in the configuration settings, receiving operation instructions from one or more secondary remote devices connected to the network supported by the wireless router, and controlling the set of light emitting elements or any other suitable output based on the operation instructions. The operation instructions can be directly received from the secondary remote devices connected to the network, or can be indirectly received from the secondary remote devices connected to the network through the router. The operation instructions can be sent by the secondary remote devices to the primary remote device (the router) in association with a connected system identifier identifying the connected system and/or with connected system credentials associated with the connected system. Alternatively, the operation instructions can be or sent to the primary remote device without identifiers, credentials, or other information associated with the connected system. The primary remote device preferably sends the operation instructions to the connected system identified by the connected system identifier or associated with the connected system credentials, but can alternatively broadcast the operation instructions to the set of connected systems connected to the primary remote device, wherein the connected system associated with the identifier or credentials can receive and unpack the operation instructions, retrieve the operation instructions from the source secondary remote device, or otherwise obtain the operation instructions. However, the connected system can be otherwise operated based on the configuration settings.

The method can additionally include receiving the set of configuration settings S500. The set of configuration settings are preferably received and stored prior to system operation based on the configuration settings, as part of the configuration routine or initialization routine, but can alternatively be received at any other suitable time. The configuration settings are preferably only received when the connected system is powered (e.g., is receiving external power, is powered by the internal power source, etc.), but can alternatively or additionally be received when the connected system is unpowered. The configuration settings are preferably received from a remote device, but can alternatively be received from a second connected device or from any other suitable source. In one variation, the configuration settings are received from a remote device different from the remote device to which the configuration settings provide access. In one example, the configuration settings can be a network identifier and password for a router, and can be received from a user device different from the router. Alternatively, the configuration settings can be received from the same remote device to which the configuration settings provide access. Alternatively, the configuration settings can be received and stored in lieu of the default credentials for the connected system. However, the configuration settings can be received in any other suitable manner.

The method can additionally include storing the configuration settings Shoo. The configuration settings are preferably stored in configuration memory, more preferably non-volatile configuration memory, but can alternatively be stored in volatile configuration memory, the reset memory, a remote system (e.g., a remote server system), or stored in any other suitable storage system. The configuration settings are preferably retained while the connected system is unpowered (e.g., when the connected system is removed from external power), but can alternatively be erased when the connected system is unpowered.

The method can additionally include storing default settings. The default settings are preferably stored in configuration memory, more preferably non-volatile configuration memory, but can alternatively be stored in volatile configuration memory, the reset memory, a remote system (e.g., a remote server system), or stored in any other suitable storage system. The default settings are preferably retained while the connected system is unpowered (e.g., when the connected system is removed from external power), but can alternatively be erased when the connected system is unpowered. The default settings can include a default identifier for the connected system, default credentials for the connected system (e.g., default passwords, encryption keys, etc.), default operation settings or parameters, the initialization routine, the configuration routine, performance maps, operating system, and/or any other suitable default operation. The default settings are preferably determined and stored on the connected system by a manufacturer, but can alternatively be determined and/or stored by a user or by any other suitable entity.

In a first example of the controlling the system based on the stored configuration settings, the method includes controlling a wireless communication module to connect to a wireless router, wherein the remote device comprises the wireless router; receiving operating instructions from the wireless router at the wireless communication module and/or control system, wherein the instructions were received by the wireless router from a second remote device different from the wireless router; and controlling the operation parameters of a light emitting element based on the operation instructions.

In a second example of the controlling the system based on the stored configuration settings, the method includes receiving a connection request form a secondary remote device including a set of credentials, verifying the credentials with a set of credentials stored in the configuration settings, permitting the secondary remote device to connect to the communication system and/or control system, receiving operation instructions from the connected secondary remote device, and controlling the operation parameters of a light emitting element based on the operation instructions. However, the system can be otherwise controlled based on the stored configuration settings.

An alternative embodiment preferably implements the above methods in a computer-readable medium storing computer-readable instructions. The instructions are preferably executed by computer-executable components preferably integrated with a lighting system. The lighting system can include a reset system including a reset switch coupled to non-volatile reset memory configured to record the reset switch state after an initialization check has been performed in response to a lighting system power-on event, non-volatile configuration memory configured to store configuration settings received from a remote device and default settings, a control system configured to perform an initialization check in response to a lighting system power-on event, the initialization checking including determining whether the reset switch position is the same as the stored position, erasing the stored configuration settings if the reset switch position is different from the stored position, and operating the lighting system based on the configuration settings if the reset switch position is similar to or the same as the stored position. The computer-readable medium can be stored on any suitable computer readable media such as RAMs, ROMs, flash memory. EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, the preferred embodiments include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

The invention claimed is:

1. A method for lighting system operation, comprising:

connecting to a local external wireless network using a set of wireless credentials stored onboard the lighting system;

receiving information within range of the local external wireless network;

when the information comprises preferred operation instructions, operating a set of light emitting elements according to the preferred operation instructions; and when the information is not addressed to the lighting system, resetting the lighting system for operation of the set of light emitting elements according to default operation instructions different from the preferred operation instructions, wherein the resetting of the lighting system comprises:

detecting a predetermined power cycle pattern;

erasing the set of credentials from a memory in response to detecting the predetermined power cycle pattern; and automatically initiating operating the set of light emitting elements according to the default operation instructions.

2. The method of claim 1, wherein the local external wireless network comprises Wi-Fi.

3. The method of claim 1, further comprising, when the information is not addressed to the lighting system, forwarding the information using the local external wireless network to an endpoint that comprises an independent wireless network of a different lighting system.

4. The method of claim 1, further comprising, when the information is not addressed to the lighting system, forwarding the information using the local external wireless network to an endpoint that comprises a central router.

5. The method of claim 1, wherein the information is received over the local external wireless network from a remote device.

6. The method of claim 5, wherein the remote device comprises a mobile device.

7. The method of claim 5, wherein the lighting system comprises the set of light emitting elements.

8. The method of claim 1, wherein the information is received over the local external wireless network from a different lighting system.

9. A lighting system, comprising:

a set of light emitting elements;

onboard storage configured to store a set of wireless network credentials;

a wireless communication module configured to connect to a local external wireless network using the set of wireless network credentials; and a reset module, configured to erase the set of wireless network credentials when a set of reset conditions are satisfied;

wherein a preferred operation instructions control operation absent the set of reset conditions being satisfied.

10. The lighting system of claim 9, wherein the wireless communication module comprises a border router configured to forward wireless packets to a central router.

11. The lighting system of claim 10, wherein the border router is further configured to forward wireless packets to an independent network of a different lighting system.

12. The lighting system of claim 9, wherein the wireless communication module is a repeater.

13. The lighting system of claim 9, wherein the preferred operation instructions are received by the wireless communication module.

14. The lighting system of claim 9, wherein the preferred operation instructions are received from a remote device, wherein the remote device is associated with the set of wireless network credentials.

15. The lighting system of claim 14, wherein the remote device comprises a mobile device.

16. The lighting system of claim 9, wherein the set of light emitting elements comprises two sets of LEDs, each with different light properties.

17. The lighting system of claim 9, wherein the lighting system is controlled based on default operation instructions after the set of wireless network credentials are erased.

* * * * *